US 11,759,056 B2

(12) United States Patent
Bannister et al.

(10) Patent No.: US 11,759,056 B2
(45) Date of Patent: Sep. 19, 2023

(54) VACUUM FOOD PROCESSING SYSTEM

(71) Applicant: SharkNinja Operating LLC, Needham, MA (US)

(72) Inventors: Sam William Bannister, Leybourne (GB); Nicholas Michael O'Loughlin, Hong Kong (CN)

(73) Assignees: SHARKNINJA OPERATING LLC, Needham, MA (US); SHARKNINJA (HONG KONG) COMPANY LIMITED, Hong Kong (CN)

( * ) Notice: Subject to any disclaimer, the term of this patent is extended or adjusted under 35 U.S.C. 154(b) by 0 days.

(21) Appl. No.: 16/813,222

(22) Filed: Mar. 9, 2020

(65) Prior Publication Data
US 2020/0281410 A1 Sep. 10, 2020

Related U.S. Application Data

(60) Provisional application No. 62/815,998, filed on Mar. 8, 2019.

(51) Int. Cl.
A47J 43/07 (2006.01)
A47J 43/046 (2006.01)
(52) U.S. Cl.
CPC ......... *A47J 43/0716* (2013.01); *A47J 43/046* (2013.01)
(58) Field of Classification Search
CPC ...... A47J 43/06; A47J 43/046; A47J 43/0716; A47J 43/0727; A47J 43/0777
See application file for complete search history.

(56) References Cited

U.S. PATENT DOCUMENTS

| 293,190 A | 2/1884 | Moore |
| 959,581 A | 5/1910 | Newton |
| 1,997,914 A | 4/1935 | Pollard |
| 2,121,621 A | 6/1938 | Adams |
| 2,121,622 A | 6/1938 | Bean |
| 2,209,559 A | 7/1940 | Brennan et al. |
| 2,355,010 A | 8/1944 | Pera |
| 2,616,593 A | 11/1952 | Leibenhaut |
| 2,761,659 A | 4/1956 | Collura |
| 2,885,134 A | 5/1959 | Cohen |
| 2,992,118 A | 7/1961 | Daline |
| 3,288,344 A | 11/1966 | Woollen et al. |

(Continued)

FOREIGN PATENT DOCUMENTS

| CN | 1987102824 A | 10/1987 |
| CN | 1073149 A | 6/1993 |

(Continued)

OTHER PUBLICATIONS

US 6,592,248 B2, 07/2003, Kressin et al. (withdrawn)

(Continued)

*Primary Examiner* — Matthew Katcoff
(74) *Attorney, Agent, or Firm* — Burns & Levinson, LLP; Joseph M. Maraia

(57) ABSTRACT

An attachment for use with a food processing system includes a sealable body including a wall and a processing chamber, a chamber opening formed in said sealable body, and a vacuum passage arranged in fluid communication with said chamber opening. The vacuum passage is associated with at least one of said wall and said processing chamber of said sealable body.

17 Claims, 18 Drawing Sheets

(56) References Cited

U.S. PATENT DOCUMENTS

| | | |
|---|---|---|
| 3,406,868 A | 10/1968 | Rogers |
| 3,521,863 A | 7/1970 | Graham |
| 3,534,435 A | 10/1970 | John |
| 3,557,411 A | 1/1971 | Ravasi |
| D242,208 S | 11/1976 | Madl et al. |
| 4,016,998 A | 4/1977 | Finch |
| 4,185,072 A | 1/1980 | Puderbaugh et al. |
| D255,313 S | 6/1980 | Elkerbout |
| 4,645,097 A | 2/1987 | Kaufman |
| 4,928,857 A | 5/1990 | Ecker |
| 4,955,724 A | 9/1990 | Otto |
| 5,005,717 A | 4/1991 | Oilar |
| 5,168,797 A | 12/1992 | Wang |
| 5,257,862 A | 11/1993 | Gardner |
| 5,328,262 A | 7/1994 | Lidgren et al. |
| D349,455 S | 8/1994 | Kostanecki et al. |
| 5,348,391 A | 9/1994 | Murray |
| D351,993 S | 11/1994 | Kaufman et al. |
| 5,368,386 A | 11/1994 | Murray |
| 5,423,476 A | 6/1995 | Ferrer |
| 5,460,264 A | 10/1995 | Rupert |
| 5,501,520 A | 3/1996 | Lidgren et al. |
| 5,558,257 A | 9/1996 | Braun |
| 5,597,089 A | 1/1997 | Smith |
| 5,603,567 A | 2/1997 | Peacock |
| D378,493 S | 3/1997 | Subbaraman et al. |
| D380,674 S | 7/1997 | Smith |
| 5,662,032 A | 9/1997 | Baratta |
| 5,667,101 A | 9/1997 | Barrash et al. |
| 5,690,021 A | 11/1997 | Grey |
| 5,797,680 A | 8/1998 | Murray |
| 5,857,771 A | 1/1999 | Draenert |
| D413,798 S | 9/1999 | LaMarra |
| 5,957,340 A | 9/1999 | Sawicki |
| 6,065,861 A | 5/2000 | Chen |
| 6,092,905 A | 7/2000 | Koehn |
| 6,135,019 A | 10/2000 | Chou |
| 6,213,358 B1 | 4/2001 | Libit et al. |
| 6,223,652 B1 | 5/2001 | Calia et al. |
| 6,321,977 B1 | 11/2001 | Lee |
| 6,491,961 B1 | 12/2002 | Balentine et al. |
| 6,499,873 B1 | 12/2002 | Chen |
| 6,712,496 B2 | 3/2004 | Kressin et al. |
| D490,468 S | 5/2004 | Akers |
| 6,780,454 B2 | 8/2004 | Balentine et al. |
| D498,642 S | 11/2004 | Huang |
| D498,643 S | 11/2004 | Pryor, Jr. et al. |
| 6,817,280 B2 | 11/2004 | Hall et al. |
| 6,817,750 B1 | 11/2004 | Sands |
| 6,860,313 B2 | 3/2005 | Greissing et al. |
| D518,332 S | 4/2006 | Feil |
| 7,044,051 B2 | 5/2006 | Le Rouzic |
| 7,066,640 B2 | 6/2006 | Sands |
| 7,100,851 B2 | 9/2006 | Hiraki et al. |
| 7,104,185 B2 | 9/2006 | Leung et al. |
| D530,568 S | 10/2006 | Wingenter |
| D537,303 S | 2/2007 | Stuckey |
| D538,595 S | 3/2007 | White et al. |
| D559,037 S | 1/2008 | Johansson |
| D560,512 S | 1/2008 | Safar |
| 7,314,136 B2 | 1/2008 | Stefandl |
| D564,832 S | 3/2008 | Bodum |
| 7,422,362 B2 | 9/2008 | Sands |
| D578,340 S | 10/2008 | Picozza et al. |
| 7,430,957 B2 | 10/2008 | Sands |
| 7,441,944 B2 | 10/2008 | Sands |
| 7,490,743 B2 | 2/2009 | Herzog |
| 7,543,925 B2 | 6/2009 | Ishizawa et al. |
| D605,462 S | 12/2009 | Picozza et al. |
| 7,858,135 B2 | 12/2010 | Radosav |
| 7,958,819 B2 | 6/2011 | Sands |
| D642,858 S | 8/2011 | Lazzer |
| D644,072 S | 8/2011 | McDonald et al. |
| D644,875 S | 9/2011 | Audette |
| 8,021,699 B2 | 9/2011 | Yoshikawa et al. |
| D647,357 S | 10/2011 | Audette et al. |
| D647,367 S | 10/2011 | Audette et al. |
| 8,047,124 B2 | 11/2011 | Lin |
| 8,047,702 B1 | 11/2011 | Lopresti |
| D654,316 S | 2/2012 | Audette |
| 8,122,821 B2 | 2/2012 | Sands |
| D663,580 S | 7/2012 | Vagnby |
| D668,115 S | 10/2012 | Potter |
| D670,958 S | 11/2012 | Picozza et al. |
| 8,383,180 B2 | 2/2013 | Vastardis |
| D677,976 S | 3/2013 | Palermo et al. |
| 8,387,520 B2 | 3/2013 | Backus |
| 8,475,860 B2 | 7/2013 | Colantonio et al. |
| 8,485,383 B2 | 7/2013 | Taufer |
| 8,561,314 B2 | 10/2013 | Kruger |
| 8,568,811 B2 | 10/2013 | Sasame et al. |
| 8,586,117 B2 | 11/2013 | Vastardis et al. |
| 8,672,533 B2 | 3/2014 | Reyes et al. |
| D704,502 S | 5/2014 | Coakley et al. |
| D705,606 S | 5/2014 | Coakley et al. |
| 8,770,099 B2 | 7/2014 | Reyhanloo |
| D711,688 S | 8/2014 | Prats |
| 8,807,022 B2 | 8/2014 | Backus |
| D712,188 S | 9/2014 | Averty |
| 8,869,686 B2 | 10/2014 | Backus |
| D721,536 S | 1/2015 | Advani |
| 8,960,084 B2 | 2/2015 | Lee |
| 8,960,578 B2 | 2/2015 | Byrne |
| 8,960,993 B2 | 2/2015 | Cheio De Oliveira et al. |
| D727,173 S | 4/2015 | De Jong |
| 8,997,633 B2 | 4/2015 | Bishop et al. |
| 8,998,176 B2 | 4/2015 | Bishop et al. |
| D728,381 S | 5/2015 | Ferraro |
| D730,682 S | 6/2015 | Tu |
| D730,683 S | 6/2015 | Tu |
| D731,242 S | 6/2015 | Machovina et al. |
| D731,243 S | 6/2015 | Machovina et al. |
| 9,051,073 B2 | 6/2015 | Jennings et al. |
| D733,488 S | 7/2015 | Tu |
| D734,637 S | 7/2015 | Benoit et al. |
| 9,113,750 B2 | 8/2015 | Clark et al. |
| D739,678 S | 9/2015 | Benoit et al. |
| D740,063 S | 10/2015 | Katz |
| 9,149,065 B2 | 10/2015 | Hoare et al. |
| D742,691 S | 11/2015 | Zhang |
| D743,204 S | 11/2015 | Zhang |
| 9,199,779 B2 | 12/2015 | Zoss et al. |
| D747,135 S | 1/2016 | Ha |
| 9,295,358 B2 | 3/2016 | Vastardis et al. |
| D755,003 S | 5/2016 | Palermo et al. |
| 9,345,795 B2 | 5/2016 | Saura Lopez et al. |
| 9,402,405 B2 | 8/2016 | Vastardis et al. |
| 9,402,410 B2 | 8/2016 | So |
| 9,414,711 B2 | 8/2016 | Tonelli et al. |
| D765,465 S | 9/2016 | Du |
| D767,334 S | 9/2016 | Pan |
| D768,437 S | 10/2016 | Lane |
| D769,061 S | 10/2016 | Diderotto |
| 9,474,403 B2 | 10/2016 | Chen |
| D771,434 S | 11/2016 | Burrows |
| D771,999 S | 11/2016 | Kettavong et al. |
| 9,486,107 B2 | 11/2016 | Kobylarz |
| D776,978 S | 1/2017 | Machovina et al. |
| 9,555,384 B2 | 1/2017 | Haney et al. |
| D778,665 S | 2/2017 | Barquin et al. |
| D779,265 S | 2/2017 | Barquin et al. |
| 9,565,872 B2 | 2/2017 | Corkin et al. |
| D780,507 S | 3/2017 | Barquin et al. |
| D783,340 S | 4/2017 | Palermo et al. |
| D783,355 S | 4/2017 | Tu |
| D784,761 S | 4/2017 | Tu |
| 9,624,024 B2 | 4/2017 | Vilinsky |
| 9,630,828 B1 | 4/2017 | Gardner |
| D789,735 S | 6/2017 | Palermo et al. |
| D789,736 S | 6/2017 | Palermo et al. |
| 9,675,212 B2 * | 6/2017 | Hewitt .................. B65D 25/56 |
| 9,687,111 B1 | 6/2017 | Trojan |
| D793,153 S | 8/2017 | Tu |
| D794,384 S | 8/2017 | Lee |

(56) References Cited

U.S. PATENT DOCUMENTS

| | | |
|---|---|---|
| D797,496 S | 9/2017 | Gee, II et al. |
| D798,101 S | 9/2017 | Rose et al. |
| 9,763,461 B2 | 9/2017 | Vastardis et al. |
| D804,248 S | 12/2017 | Tu |
| D807,700 S | 1/2018 | Tu |
| D808,718 S | 1/2018 | Coakley |
| D808,719 S | 1/2018 | Coakley |
| 9,855,535 B2 | 1/2018 | Arnett et al. |
| D809,333 S | 2/2018 | Lee |
| 9,888,807 B2 | 2/2018 | Starr et al. |
| D811,806 S | 3/2018 | Bock |
| D813,603 S | 3/2018 | Tu |
| D813,604 S | 3/2018 | Tu |
| 9,907,430 B2 | 3/2018 | Vastardis et al. |
| 9,924,824 B2 | 3/2018 | Backus |
| 9,924,837 B1 | 3/2018 | Trojan |
| 9,924,838 B2 | 3/2018 | Potter et al. |
| 9,930,986 B2 | 4/2018 | Arai et al. |
| D816,383 S | 5/2018 | Liang |
| 9,962,030 B2 | 5/2018 | Avins et al. |
| 9,993,105 B2 | 6/2018 | Bishop et al. |
| 9,999,319 B2 | 6/2018 | Kim |
| D821,806 S | 7/2018 | Coakley et al. |
| 10,055,347 B1 | 8/2018 | Trojan |
| D832,029 S | 10/2018 | Gee, II et al. |
| 10,105,003 B2 | 10/2018 | Tsutsumi et al. |
| 10,117,444 B2 | 11/2018 | Vastardis et al. |
| 10,123,650 B2 | 11/2018 | McLaughlin et al. |
| D834,878 S | 12/2018 | Moon et al. |
| D835,463 S | 12/2018 | Coakley |
| 10,143,323 B2 | 12/2018 | Backus |
| 10,182,680 B2 | 1/2019 | Koetz |
| 10,196,595 B2 | 2/2019 | Butte |
| 10,213,047 B2 | 2/2019 | Boggavarapu |
| D842,643 S | 3/2019 | Mullen et al. |
| D842,644 S | 3/2019 | Kettavong et al. |
| 10,226,147 B2 | 3/2019 | Harper |
| D846,337 S | 4/2019 | Duan et al. |
| D846,338 S | 4/2019 | Smith et al. |
| D846,339 S | 4/2019 | Smith |
| 10,299,629 B2 | 5/2019 | Bascom et al. |
| D851,982 S | 6/2019 | Deleo et al. |
| D852,566 S | 7/2019 | Chen |
| D860,724 S | 9/2019 | Kassin et al. |
| D865,438 S | 11/2019 | Coakley et al. |
| D867,804 S | 11/2019 | Gronkowski |
| 10,617,260 B2 | 4/2020 | Sapire |
| 10,638,867 B2 * | 5/2020 | Zhang ................ A47J 43/046 |
| 10,736,465 B2 | 8/2020 | Dickson, Jr. et al. |
| 10,799,071 B2 | 10/2020 | Pamplin |
| 10,905,286 B2 * | 2/2021 | Cuaresma, Jr. ..... A47J 43/0727 |
| 2001/0000570 A1 | 5/2001 | Aarts |
| 2002/0009401 A1 | 1/2002 | Osborn |
| 2003/0227818 A1 | 12/2003 | Villwock et al. |
| 2004/0025703 A1 | 2/2004 | Ming |
| 2004/0065668 A1 | 4/2004 | Lee |
| 2004/0155063 A1 | 8/2004 | Hofeldt |
| 2004/0159243 A1 | 8/2004 | Theodos |
| 2004/0173105 A1 | 9/2004 | Kim et al. |
| 2004/0195120 A1 | 10/2004 | Anderson |
| 2004/0208079 A1 | 10/2004 | Hein |
| 2005/0229795 A1 | 10/2005 | Stuckey |
| 2005/0269336 A1 | 12/2005 | Rockhill et al. |
| 2006/0000369 A1 | 1/2006 | Hsu |
| 2006/0120215 A1 | 6/2006 | Sands |
| 2006/0124536 A1 | 6/2006 | Guerrero |
| 2007/0183256 A1 | 8/2007 | Sands |
| 2008/0037360 A1 | 2/2008 | McGill |
| 2008/0067195 A1 | 3/2008 | Jennings et al. |
| 2009/0084275 A1 | 4/2009 | Liang |
| 2009/0165655 A1 | 7/2009 | Aonuma |
| 2009/0229478 A1 | 9/2009 | Wu |
| 2009/0266787 A1 | 10/2009 | Son |
| 2009/0297671 A1 | 12/2009 | Basker et al. |
| 2010/0003379 A1 | 1/2010 | Zoss et al. |
| 2010/0203209 A1 | 8/2010 | Fishbein et al. |
| 2011/0127297 A1 | 6/2011 | Jennings et al. |
| 2012/0152131 A1 | 6/2012 | Sands |
| 2012/0196014 A1 | 8/2012 | Yao |
| 2013/0133521 A1 | 5/2013 | Vastardis |
| 2014/0247686 A1 | 9/2014 | Arnett et al. |
| 2014/0286123 A1 | 9/2014 | Arnett et al. |
| 2014/0290503 A1 | 10/2014 | Bae |
| 2015/0059597 A1 | 3/2015 | Lee |
| 2015/0098299 A1 | 4/2015 | Sapire |
| 2015/0138910 A1 | 5/2015 | Cha et al. |
| 2015/0146496 A1 | 5/2015 | Lucon et al. |
| 2015/0201808 A1 | 7/2015 | Katsuki et al. |
| 2015/0208844 A1 | 7/2015 | Liang |
| 2015/0351567 A1 | 12/2015 | Tristram |
| 2016/0183582 A1 | 6/2016 | Bauer |
| 2016/0220071 A1 | 8/2016 | Hewitt et al. |
| 2016/0255983 A1 | 9/2016 | Barquin et al. |
| 2016/0324358 A1 | 11/2016 | Backus |
| 2016/0324369 A1 | 11/2016 | Lee |
| 2016/0331182 A1 | 11/2016 | Golino |
| 2016/0345773 A1 | 12/2016 | Tonelli et al. |
| 2016/0348962 A1 | 12/2016 | Roekens et al. |
| 2016/0367063 A1 | 12/2016 | Vastardis et al. |
| 2017/0007067 A1 | 1/2017 | Shima et al. |
| 2017/0049260 A1 | 2/2017 | Beber et al. |
| 2017/0086622 A1 | 3/2017 | Chung |
| 2017/0095122 A1 | 4/2017 | Hoare et al. |
| 2017/0143155 A1 | 5/2017 | Lin |
| 2017/0150744 A1 | 6/2017 | Wangler |
| 2017/0164776 A1 | 6/2017 | Floessholzer et al. |
| 2017/0224166 A1 | 8/2017 | Sedlacek et al. |
| 2017/0231431 A1 | 8/2017 | Maeng |
| 2017/0245668 A1 | 8/2017 | Upston et al. |
| 2017/0295982 A1 | 10/2017 | Holzbauer et al. |
| 2017/0295992 A1 | 10/2017 | Mangold et al. |
| 2017/0303571 A1 | 10/2017 | Alden |
| 2017/0341253 A1 | 11/2017 | Arriens et al. |
| 2018/0014695 A1 | 1/2018 | Gross et al. |
| 2018/0043321 A1 | 2/2018 | Mochizuki |
| 2018/0079584 A1 | 3/2018 | Jung |
| 2018/0098666 A1 | 4/2018 | Le |
| 2018/0192814 A1 | 7/2018 | Gormley et al. |
| 2018/0192815 A1 | 7/2018 | Vastardis et al. |
| 2018/0199762 A1 | 7/2018 | Kim |
| 2018/0220829 A1 | 8/2018 | Zhang et al. |
| 2018/0222679 A1 | 8/2018 | Iwasaka et al. |
| 2018/0296022 A1 | 10/2018 | Avins et al. |
| 2018/0310769 A1 | 11/2018 | Kim |
| 2018/0326378 A1 | 11/2018 | Moon |
| 2018/0360256 A1 | 12/2018 | Ford et al. |
| 2018/0360271 A1 | 12/2018 | Katsuki et al. |
| 2019/0000272 A1 | 1/2019 | Katsuki et al. |
| 2019/0009233 A1 | 1/2019 | Furman et al. |
| 2019/0059409 A1 | 2/2019 | Vastardis et al. |
| 2020/0281408 A1 | 9/2020 | Bannister et al. |
| 2020/0281409 A1 | 9/2020 | Bannister et al. |

FOREIGN PATENT DOCUMENTS

| | | |
|---|---|---|
| CN | 1255841 A | 6/2000 |
| CN | 2390533 Y | 8/2000 |
| CN | 1432518 A | 7/2003 |
| CN | 1162115 C | 8/2004 |
| CN | 1525830 A | 9/2004 |
| CN | 1586378 A | 3/2005 |
| CN | 1213686 C | 8/2005 |
| CN | 1655707 A | 8/2005 |
| CN | 2730269 Y | 10/2005 |
| CN | 1792306 A | 6/2006 |
| CN | 1268263 C | 8/2006 |
| CN | 2808015 Y | 8/2006 |
| CN | 1282438 C | 11/2006 |
| CN | 100337572 C | 9/2007 |
| CN | 201001611 Y | 1/2008 |
| CN | 201067329 Y | 6/2008 |
| CN | 100418461 C | 9/2008 |
| CN | 100522753 C | 8/2009 |
| CN | 100581426 C | 1/2010 |

(56) References Cited

FOREIGN PATENT DOCUMENTS

| | | |
|---|---|---|
| CN | 101663142 A | 3/2010 |
| CN | 101238036 B | 5/2010 |
| CN | 101291609 B | 6/2010 |
| CN | 201505039 U | 6/2010 |
| CN | 101779928 A | 7/2010 |
| CN | 101181127 B | 2/2011 |
| CN | 102058327 A | 5/2011 |
| CN | 102083345 A | 6/2011 |
| CN | 102123600 A | 7/2011 |
| CN | 201899357 U | 7/2011 |
| CN | 201977619 U | 9/2011 |
| CN | 102245068 A | 11/2011 |
| CN | 101854839 B | 5/2012 |
| CN | 102429590 A | 5/2012 |
| CN | 101637242 B | 6/2012 |
| CN | 102670096 A | 9/2012 |
| CN | 101522039 B | 10/2012 |
| CN | 202681713 U | 1/2013 |
| CN | 202698925 U | 1/2013 |
| CN | 207613666 U | 1/2013 |
| CN | 102984951 B | 3/2013 |
| CN | 202875005 U | 4/2013 |
| CN | 203074329 U | 7/2013 |
| CN | 203447138 U | 2/2014 |
| CN | 103857317 A | 6/2014 |
| CN | 203647102 U | 6/2014 |
| CN | 102355839 B | 8/2014 |
| CN | 103960992 A | 8/2014 |
| CN | 104305872 A | 1/2015 |
| CN | 102292011 B | 4/2015 |
| CN | 102631153 B | 4/2015 |
| CN | 204274217 A | 4/2015 |
| CN | 204600200 U | 9/2015 |
| CN | 204698308 A | 10/2015 |
| CN | 103813741 B | 12/2015 |
| CN | 103354793 B | 2/2016 |
| CN | 105455688 A | 4/2016 |
| CN | 105520659 A | 4/2016 |
| CN | 105686701 A | 6/2016 |
| CN | 105919396 A | 9/2016 |
| CN | 105996826 A | 10/2016 |
| CN | 205658804 U | 10/2016 |
| CN | 106073538 A | 11/2016 |
| CN | 106108596 A | 11/2016 |
| CN | 106108599 A | 11/2016 |
| CN | 106108709 A | 11/2016 |
| CN | 106136903 A | 11/2016 |
| CN | 106136961 A | 11/2016 |
| CN | 106136962 A | 11/2016 |
| CN | 205697388 U * | 11/2016 |
| CN | 103126552 B | 12/2016 |
| CN | 106231966 A | 12/2016 |
| CN | 106235907 A | 12/2016 |
| CN | 106264202 A | 1/2017 |
| CN | 106333616 A | 1/2017 |
| CN | 106361183 A | 2/2017 |
| CN | 106377152 A | 2/2017 |
| CN | 106377181 A | 2/2017 |
| CN | 106419642 A | 2/2017 |
| CN | 104720553 B | 3/2017 |
| CN | 103720339 B | 4/2017 |
| CN | 104853657 B | 4/2017 |
| CN | 106580133 A | 4/2017 |
| CN | 206062911 U | 4/2017 |
| CN | 106659310 A | 5/2017 |
| CN | 106724559 A | 5/2017 |
| CN | 106724947 A | 5/2017 |
| CN | 106742714 A | 5/2017 |
| CN | 106798496 A | 6/2017 |
| CN | 206227556 U | 6/2017 |
| CN | 106974565 A | 7/2017 |
| CN | 206295245 U | 7/2017 |
| CN | 206324658 U | 7/2017 |
| CN | 107019425 A | 8/2017 |
| CN | 107019441 A | 8/2017 |
| CN | 107049072 A | 8/2017 |
| CN | 107088005 A | 8/2017 |
| CN | 107095598 A | 8/2017 |
| CN | 107148234 A | 9/2017 |
| CN | 107157356 A | 9/2017 |
| CN | 107212772 A | 9/2017 |
| CN | 206453647 U | 9/2017 |
| CN | 107224225 A | 10/2017 |
| CN | 107280517 A | 10/2017 |
| CN | 107303150 A | 10/2017 |
| CN | 107319965 A | 11/2017 |
| CN | 107373278 A | 11/2017 |
| CN | 105682517 B | 12/2017 |
| CN | 107411477 A | 12/2017 |
| CN | 107411589 A | 12/2017 |
| CN | 206688628 U | 12/2017 |
| CN | 107595164 A | 1/2018 |
| CN | 206867155 U | 1/2018 |
| CN | 107713697 A | 2/2018 |
| CN | 107713825 A | 2/2018 |
| CN | 105902133 B | 3/2018 |
| CN | 107788844 A | 3/2018 |
| CN | 107822529 A | 3/2018 |
| CN | 107874651 A | 4/2018 |
| CN | 107912982 A | 4/2018 |
| CN | 207168385 U | 4/2018 |
| CN | 107997525 A | 5/2018 |
| CN | 108013791 A | 5/2018 |
| CN | 108065810 A | 5/2018 |
| CN | 108078438 A | 5/2018 |
| CN | 207341667 U | 5/2018 |
| CN | 108143312 A | 6/2018 |
| CN | 207506464 U | 6/2018 |
| CN | 108272359 A | 7/2018 |
| CN | 108283444 A | 7/2018 |
| CN | 207640256 U | 7/2018 |
| CN | 108378725 A | 8/2018 |
| CN | 108415344 A | 8/2018 |
| CN | 108451395 A | 8/2018 |
| CN | 108471901 A | 8/2018 |
| CN | 106580132 B | 9/2018 |
| CN | 108478009 A | 9/2018 |
| CN | 108577547 A | 9/2018 |
| CN | 108577597 A | 9/2018 |
| CN | 108601485 A | 9/2018 |
| CN | 108606663 A | 10/2018 |
| CN | 108652478 A | 10/2018 |
| CN | 108670063 A | 10/2018 |
| CN | 207940815 U | 10/2018 |
| CN | 108720603 A | 11/2018 |
| CN | 108742189 A | 11/2018 |
| CN | 108903698 A | 11/2018 |
| CN | 208030887 U | 11/2018 |
| CN | 109044075 A | 12/2018 |
| CN | 109091035 A | 12/2018 |
| CN | 109124296 A | 1/2019 |
| CN | 305916020 S | 7/2020 |
| EP | 0676161 | 7/1998 |
| EP | 3424380 A1 | 1/2019 |
| GB | 2556646 A | 6/2018 |
| JP | 1523840 | 4/2015 |
| JP | 1528172 S | 7/2015 |
| JP | 1559194 | 8/2016 |
| JP | 1618973 | 11/2018 |
| JP | 1618976 | 11/2018 |
| JP | 1659173 | 4/2020 |
| KR | 101821786 | 1/2018 |
| WO | 2008034020 A1 | 3/2008 |
| WO | 2008095309 A1 | 8/2008 |
| WO | 2009001244 A2 | 12/2008 |
| WO | 2015097606 A3 | 7/2015 |
| WO | 2016165454 A1 | 10/2016 |
| WO | 2017100326 A1 | 6/2017 |
| WO | 2017147059 A1 | 8/2017 |
| WO | 2017153341 A1 | 9/2017 |
| WO | 2017165422 A1 | 9/2017 |
| WO | WO-2017181838 A1 * | 10/2017 ............ A47J 43/046 |
| WO | 2017211987 A1 | 12/2017 |
| WO | 2018006776 A1 | 1/2018 |

(56) References Cited

FOREIGN PATENT DOCUMENTS

| | | | |
|---|---|---|---|
| WO | 2018007831 A1 | 1/2018 |
| WO | 2018014226 A1 | 1/2018 |
| WO | 2018024371 A1 | 2/2018 |
| WO | 2018043872 A1 | 3/2018 |
| WO | 2018071589 A1 | 4/2018 |
| WO | 2018072504 A1 | 4/2018 |
| WO | 2018072505 A1 | 4/2018 |
| WO | 2018075446 A1 | 4/2018 |
| WO | 2018092997 A1 | 5/2018 |
| WO | 2018103312 A1 | 6/2018 |
| WO | 2018115402 A1 | 6/2018 |
| WO | 2018127716 A1 | 7/2018 |
| WO | 2018135697 A1 | 7/2018 |
| WO | 2018148418 A1 | 8/2018 |
| WO | 2018148954 A1 | 8/2018 |
| WO | 2018159958 A1 | 9/2018 |
| WO | 2018186598 A1 | 10/2018 |
| WO | 2018190537 A1 | 10/2018 |
| WO | 2018231103 A1 | 12/2018 |
| WO | 2018234275 A1 | 12/2018 |
| WO | 2019006983 A1 | 1/2019 |
| WO | 2019007920 A1 | 1/2019 |
| WO | 2019010504 A1 | 1/2019 |
| WO | 2019035592 A1 | 2/2019 |
| WO | 2019036486 A1 | 2/2019 |
| WO | 2019030803 A1 | 11/2019 |
| WO | 2019030805 A1 | 11/2019 |

OTHER PUBLICATIONS

International Search Report for International Application No. PCT/US2020/021718 filed Mar. 9, 2020; dated May 19, 2020; 6 pages.

International Search Report for International Application No. PCT/US2020/021719 filed Mar. 9, 2020; dated May 19, 2020; 6 pages.

Japanese Design Application No. 201927097 filed Dec. 6, 2019; Notice of Allowance dated Jun. 12, 2020; 10 pages.

Japanese Design Application No. 201927098 filed Dec. 6, 2019; Notice of Allowance dated Jun. 12, 2020; 10 pages.

Written Opinion for International Application No. PCT/US2020/021718 filed Mar. 9, 2020; dated May 19, 2020; 8 pages.

Written Opinion for International Application No. PCT/US2020/021719 filed Mar. 9, 2020; dated May 19, 2020; 8 pages.

Amazon.com; "Addwin Countertop Blender Professional Commercial Mixer Blender"; Nov. 8, 2018; https://www.amazon.com/dp/B07KBYWB7L/ (Year: 2018); 1 page.

Chinese Application No. 201930680320X filed Dec. 6, 2019; Chinese Office Action with English Translation dated Jul. 23, 2020; 3 pages.

International Search Report for International Application No. PCT/US2020/021728; International Filing Date: Mar. 9, 2020; dated Jul. 16, 2020; 7 pages.

International Search Report for International Application No. PCT/US2020/037484; International Filing Date: Jun. 12, 2020; dated Sep. 22, 2020; 6 pages.

Japanese Application No. 2020-11176 filed Jun. 5, 2020; Notice of Allowance dated Sep. 2, 2020; 6 pages.

U.S. Appl. No. 29/694,049, filed Jun. 6, 2019; Restriction Requirement dated Jul. 29, 2020; 62 pages.

U.S. Appl. No. 29/694,050, filed Jun. 6, 2019; Notice of Allowance dated Jul. 29, 2020; 40 pages.

U.S. Appl. No. 29/740,552, filed Jul. 6, 2020; Restriction Requirement dated Oct. 2, 2020; 8 pages.

U.S. Appl. No. 29/740,562, filed Jul. 6, 2020; Restriction Requirement dated Oct. 2, 2020; 8 pages.

Written Opinion for International Application No. PCT/US2020/021728; International Filing Date: Mar. 9, 2020; dated Jul. 16, 2020; 10 pages.

Written Opinion for International Application No. PCT/US2020/037484; International Filing Date: Jun. 12, 2020; dated Sep. 22, 2020; 8 pages.

Amazon.com; "Vitamix Con A3300 Ascent Series Smart Blender"; Available on amazon.com Jan. 5, 2017; (Year: 2017); https://www.amazon.com/dp/B01MT67Z7B/; 1 page.

U.S. Appl. No. 29/694,050, filed Jun. 6, 2019; Notice of Allowance dated Oct. 29, 2020; 15 pages.

U.S. Appl. No. 29/694,051, filed Jun. 6, 2019; Restriction Requirement dated Dec. 15, 2020; 62 pages.

U.S. Appl. No. 29/740,272, filed Jul. 2, 2020; Restriction Requirement dated Nov. 25, 2020; 7 pages.

\* cited by examiner

VACUUM FOOD PROCESSING SYSTEM

CROSS-REFERENCE TO RELATED APPLICATIONS

This application is claims priority to U.S. Provisional Application Ser. No. 62/815,998, filed Mar. 8, 2019, the entire contents of which are incorporated herein by reference.

BACKGROUND

Exemplary embodiments of the present invention relate to a blender, and more particularly to a container of a blender configured to receive one or more food items therein.

Blenders are commonly used to process a plurality of different food products, including liquids, solids, semi-solids, gels and the like. It is well-known that blenders are useful devices for blending, cutting, and dicing food products in a wide variety of commercial settings, including home kitchen use, professional restaurant or food services use, and large-scale industrial use. They offer a convenient alternative to chopping or dicing by hand, and often come with a range of operational settings and modes adapted to provide specific types or amounts of food processing, e.g., as catered to particular food products.

Several benefits can be achieved by forming a vacuum within a blender container or attachment either prior to or after a blending operation. For example, by forming a vacuum prior to a blending operation, the overall degradation of the nutritional properties of the ingredients being processes may be reduced. Accordingly, a blender container or attachment may include a seal that is movable to selectively form a vacuum within the blender container. However, when the blender container is used in high vibration environments, such as in a vehicle or when the container is being carried in a bag for example, it is possible that liquid or other ingredients from the interior of the blender container may leak through the seal.

SUMMARY

According to an embodiment, an attachment for use with a food processing system includes a sealable body including a wall and a processing chamber, a chamber opening formed in said sealable body, and a vacuum passage arranged in fluid communication with said chamber opening. The vacuum passage is associated with at least one of said wall and said processing chamber of said sealable body.

In addition to one or more of the features described above, or as an alternative, in further embodiments a portion of said vacuum passage is at least partially defined by said wall.

In addition to one or more of the features described above, or as an alternative, in further embodiments a portion of said vacuum passage is integrally formed with said wall of said sealable body.

In addition to one or more of the features described above, or as an alternative, in further embodiments said vacuum passage is arranged at a side of said sealable body, external to said wall and said processing chamber.

In addition to one or more of the features described above, or as an alternative, in further embodiments comprising a secondary structure connected to said wall, wherein said secondary structure and said wall cooperate to define at least a portion of said vacuum passage.

In addition to one or more of the features described above, or as an alternative, in further embodiments said secondary structure is overmolded to said wall.

In addition to one or more of the features described above, or as an alternative, in further embodiments said secondary structure is a molded channel.

In addition to one or more of the features described above, or as an alternative, in further embodiments said secondary structure is an extruded channel.

In addition to one or more of the features described above, or as an alternative, in further embodiments said secondary structure is affixed to said wall via an induction weld.

In addition to one or more of the features described above, or as an alternative, in further embodiments said secondary structure forms a seamless interface with said wall.

In addition to one or more of the features described above, or as an alternative, in further embodiments at least a portion of said secondary structure is flush with an adjacent surface of said wall.

In addition to one or more of the features described above, or as an alternative, in further embodiments a portion of said vacuum passage extends through said processing chamber.

In addition to one or more of the features described above, or as an alternative, in further embodiments said portion of said vacuum passage is mounted to an interior surface of said wall.

In addition to one or more of the features described above, or as an alternative, in further embodiments said vacuum passage is at least partially defined by a rigid tube.

In addition to one or more of the features described above, or as an alternative, in further embodiments comprising a vacuum chamber connected to said vacuum passage and said chamber opening.

In addition to one or more of the features described above, or as an alternative, in further embodiments comprising a cover mounted to said sealable body, wherein said cover and said sealable body cooperate to define said vacuum chamber.

In addition to one or more of the features described above, or as an alternative, in further embodiments comprising a lid, wherein said vacuum chamber is defined within said lid.

In addition to one or more of the features described above, or as an alternative, in further embodiments comprising a vacuum sealing assembly arranged within said chamber opening.

In addition to one or more of the features described above, or as an alternative, in further embodiments comprising a release mechanism associated with said processing chamber, wherein said release mechanism is movable to fluidly couple said processing chamber to an ambient atmosphere external to said sealable body.

In addition to one or more of the features described above, or as an alternative, in further embodiments said sealable body has a first orientation when separated from said food processing base and a second orientation when connected to said food processing base.

In addition to one or more of the features described above, or as an alternative, in further embodiments said sealable body has a first orientation when separated from said food processing base and when connected to said food processing base.

According to yet another embodiment, a food processing system includes a food processor base including a vacuum system and an attachment configured for removable association with the food processor base. The attachment includes a sealable body including a wall and a processing chamber. A chamber opening is formed in the sealable body and a vacuum passage is arranged in fluid communication with the chamber opening. The vacuum passage is associated with at least one of said wall and said processing chamber of the sealable body. When the attachment is installed about said food processor base, the vacuum passage is fluidly connected to said vacuum system.

In addition to one or more of the features described above, or as an alternative, in further embodiments said vacuum system is arranged adjacent a first side of said food processing base, and said vacuum passage is aligned with said first side of said food processing base when installed to said food processing base.

In addition to one or more of the features described above, or as an alternative, in further embodiments a portion of said vacuum passage is at least partially defined by said wall.

In addition to one or more of the features described above, or as an alternative, in further embodiments a portion of said vacuum passage is integrally formed with said wall of said sealable body.

In addition to one or more of the features described above, or as an alternative, in further embodiments said vacuum passage is arranged at a side of said sealable body, external to said wall and said processing chamber.

In addition to one or more of the features described above, or as an alternative, in further embodiments said sealable body includes a secondary structure connected to said wall, wherein said secondary structure and said wall cooperate to define at least a portion of said vacuum passage.

In addition to one or more of the features described above, or as an alternative, in further embodiments said secondary structure is overmolded to said wall.

In addition to one or more of the features described above, or as an alternative, in further embodiments said secondary structure is a molded channel.

In addition to one or more of the features described above, or as an alternative, in further embodiments said secondary structure is an extruded channel.

In addition to one or more of the features described above, or as an alternative, in further embodiments said secondary structure affixed to said wall via an induction weld.

In addition to one or more of the features described above, or as an alternative, in further embodiments said secondary structure forms a seamless interface with said wall.

In addition to one or more of the features described above, or as an alternative, in further embodiments at least a portion of said secondary structure is flush with an adjacent surface of said wall.

In addition to one or more of the features described above, or as an alternative, in further embodiments a portion of said vacuum passage extends through said processing chamber.

In addition to one or more of the features described above, or as an alternative, in further embodiments said portion of said vacuum passage is mounted to an interior surface of said wall.

In addition to one or more of the features described above, or as an alternative, in further embodiments said vacuum passage is at least partially defined by a rigid tube.

In addition to one or more of the features described above, or as an alternative, in further embodiments comprising a vacuum chamber connected to said vacuum passage and said chamber opening.

In addition to one or more of the features described above, or as an alternative, in further embodiments comprising a cover mounted to said sealable body, wherein said cover and said sealable body cooperate to define said vacuum chamber.

In addition to one or more of the features described above, or as an alternative, in further embodiments comprising a lid, wherein said vacuum chamber is defined within said lid.

In addition to one or more of the features described above, or as an alternative, in further embodiments comprising a vacuum sealing assembly arranged within said chamber opening.

In addition to one or more of the features described above, or as an alternative, in further embodiments comprising a release mechanism associated with said processing chamber, wherein said release mechanism is movable to fluidly couple said processing chamber to an ambient atmosphere external to said sealable body.

In addition to one or more of the features described above, or as an alternative, in further embodiments said sealable body has a first orientation when separated from said food processing base and a second orientation when connected to said food processing base.

In yet another embodiment, an attachment for use with a food processing system includes a sealable body including a processing chamber, a vacuum path extending from the processing chamber through at least a portion of said sealable body, and a release path extending from the processing chamber to an exterior of said sealable body. The vacuum path is separate from the release path.

In addition to one or more of the features described above, or as an alternative, in further embodiments said vacuum path further comprises a vacuum chamber and a vacuum passage, said vacuum passage being integral with said sealable body.

In addition to one or more of the features described above, or as an alternative, in further embodiments comprising a cover mounted to said sealable body, wherein said cover and said sealable body cooperate to define said vacuum chamber.

In addition to one or more of the features described above, or as an alternative, in further embodiments comprising a lid connectable to an open end of said sealable body to seal said processing chamber, wherein said vacuum chamber is defined within said lid.

In addition to one or more of the features described above, or as an alternative, in further embodiments comprising a chamber opening connecting said processing chamber to said vacuum chamber and a vacuum sealing assembly arranged within said chamber opening.

In addition to one or more of the features described above, or as an alternative, in further embodiments said release path includes a release opening formed in a wall defining an end of said processing chamber.

In addition to one or more of the features described above, or as an alternative, in further embodiments comprising a release mechanism associated with said release opening, said release opening being movable to couple said processing chamber to an ambient atmosphere external to said sealable body.

In addition to one or more of the features described above, or as an alternative, in further embodiments said vacuum sealing assembly and said release mechanism are independently operable.

According to another embodiment, a food processing system includes a food processor base including a vacuum system and an attachment configured for removable association with said food processor base. The attachment includes a sealable body including a processing chamber and a vacuum path extending from said processing chamber through at least a portion of said sealable body. The vacuum path of said attachment is arranged in fluid communication with said vacuum system when said attachment is connected to said food processing base. A release path extends from said processing chamber to an exterior of said sealable body. The vacuum path is separate from the release path.

In addition to one or more of the features described above, or as an alternative, in further embodiments said vacuum path further comprises a vacuum chamber and a vacuum passage, said vacuum passage being integral with said sealable body.

In addition to one or more of the features described above, or as an alternative, in further embodiments comprising a cover mounted to said sealable body, wherein said cover and said sealable body cooperate to define said vacuum chamber.

In addition to one or more of the features described above, or as an alternative, in further embodiments comprising a lid connectable to an open end of said sealable body to seal said processing chamber, wherein said vacuum chamber is defined within said lid.

In addition to one or more of the features described above, or as an alternative, in further embodiments said vacuum path further comprises a chamber opening connecting said processing chamber to said vacuum chamber.

In addition to one or more of the features described above, or as an alternative, in further embodiments comprising a vacuum sealing assembly arranged within said chamber opening.

In addition to one or more of the features described above, or as an alternative, in further embodiments said release path further comprising a release opening formed in a wall defining an end of said processing chamber.

In addition to one or more of the features described above, or as an alternative, in further embodiments comprising a release mechanism associated with said release opening, said release opening being movable to couple said processing chamber to an ambient atmosphere external to said sealable body.

In addition to one or more of the features described above, or as an alternative, in further embodiments said vacuum path includes a movable vacuum sealing assembly and said release path includes a movable release mechanism, said vacuum sealing assembly and said release mechanism being independently operable.

According to yet another embodiment, an attachment assembly for use with a food processing system includes a container having a processing chamber including an open end, an accessory connectable to the open end of said container to seal said processing chamber, and a vacuum passage having an inlet and an outlet. The inlet is arranged in fluid communication with the processing chamber, and the outlet is located at an area of said container separate from said accessory.

In addition to one or more of the features described above, or as an alternative, in further embodiments said outlet is vertically offset from said open end of said container.

In addition to one or more of the features described above, or as an alternative, in further embodiments said vacuum passage is associated with at least one of a wall of said container and said processing chamber.

In addition to one or more of the features described above, or as an alternative, in further embodiments a portion of said vacuum passage is integrally formed with said wall.

In addition to one or more of the features described above, or as an alternative, in further embodiments said vacuum passage is arranged at a side of said container, external to said wall and said processing chamber.

In addition to one or more of the features described above, or as an alternative, in further embodiments comprising a secondary structure connected to said wall, wherein said secondary structure and said wall cooperate to define at least a portion of said vacuum passage.

In addition to one or more of the features described above, or as an alternative, in further embodiments said secondary structure forms a seamless interface with said wall.

In addition to one or more of the features described above, or as an alternative, in further embodiments at least a portion of said secondary structure is flush with an adjacent surface of said wall.

In addition to one or more of the features described above, or as an alternative, in further embodiments said vacuum passage is at least partially defined by a rigid tube.

In addition to one or more of the features described above, or as an alternative, in further embodiments said sealable body has a first orientation when separated from said food processing base and when connected to said food processing base.

In addition to one or more of the features described above, or as an alternative, in further embodiments said accessory is a lid.

In addition to one or more of the features described above, or as an alternative, in further embodiments said container has a first orientation when separated from said food processing base and a second orientation when connected to said food processing base.

In addition to one or more of the features described above, or as an alternative, in further embodiments said accessory is a rotatable blade assembly.

According to yet another embodiment, a method of forming a vacuum in a processing chamber of an attachment of a food processing system includes operating a vacuum mechanism arranged in fluid communication with vacuum chamber formed in the attachment, sensing a pressure of said vacuum chamber, detecting that said pressure within said vacuum chamber is equal to a target pressure, and operating said vacuum mechanism after said pressure within said vacuum chamber is equal to said target pressure.

In addition to one or more of the features described above, or as an alternative, in further embodiments operating said vacuum mechanism after said pressure within said vacuum chamber is equal to said target pressure includes operating said vacuum mechanism continuously.

In addition to one or more of the features described above, or as an alternative, in further embodiments operating said vacuum mechanism after said pressure within said vacuum chamber is equal to said target pressure includes operating said vacuum mechanism intermittently.

In addition to one or more of the features described above, or as an alternative, in further embodiments operating said vacuum mechanism after said pressure within said vacuum chamber is equal to said target pressure includes operating said vacuum mechanism for a fixed period of time after said pressure within said vacuum chamber is equal to said target pressure.

In addition to one or more of the features described above, or as an alternative, in further embodiments operating said vacuum mechanism after said pressure within said vacuum chamber is equal to said target pressure includes operating said vacuum mechanism until said pressure within said vacuum chamber is equal to another target pressure, different from said target pressure.

In addition to one or more of the features described above, or as an alternative, in further embodiments said another target pressure is a greater negative pressure than said target pressure.

BRIEF DESCRIPTION OF THE FIGURES

The accompanying drawings incorporated in and forming a part of the specification embodies several aspects of the present invention and, together with the description, serves to explain the principles of the invention. In the drawings.

The detailed description explains embodiments of the invention, together with advantages and features, by way of example with reference to the drawings.

DETAILED DESCRIPTION

Figure 1:
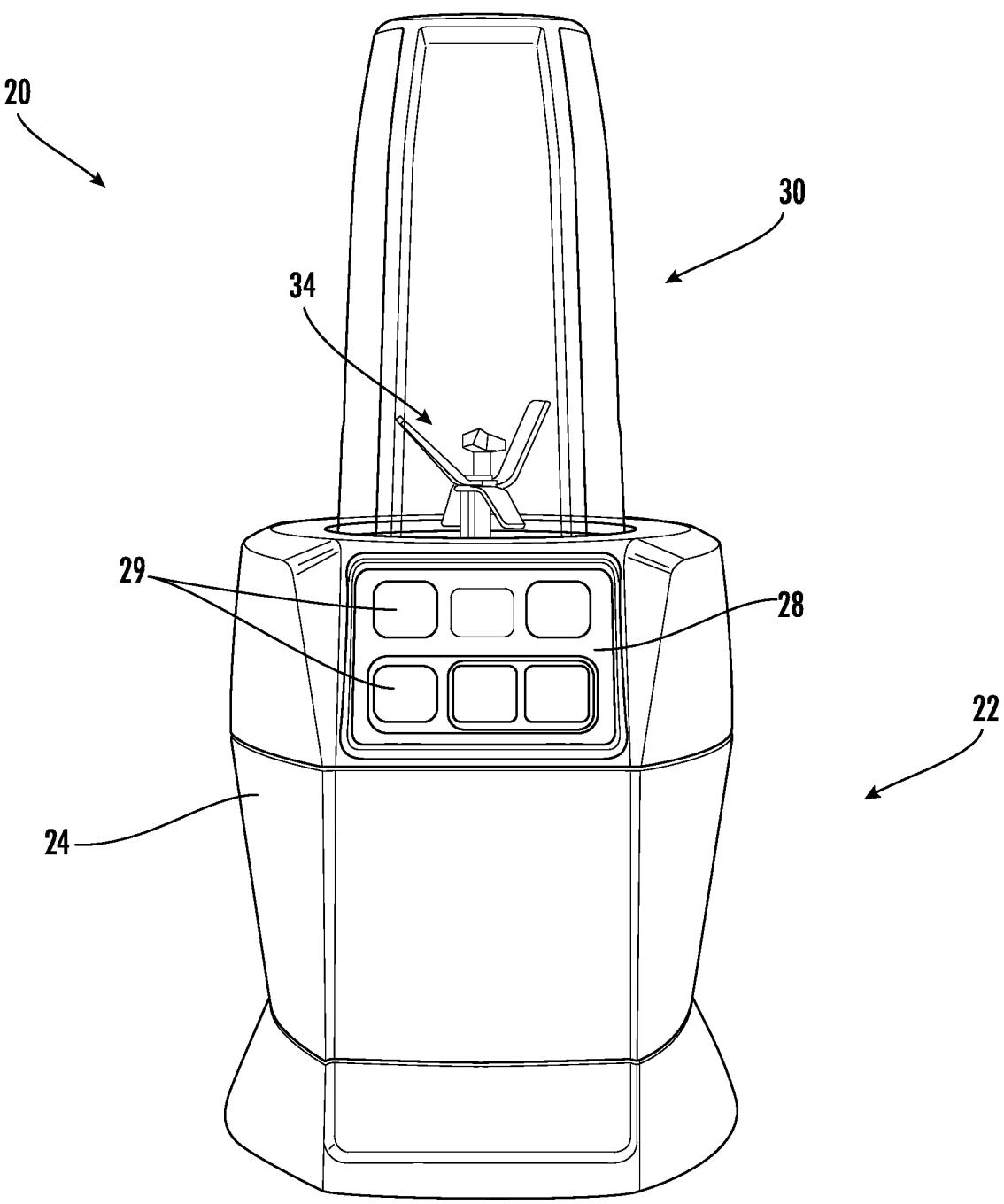
FIG. 1 is a perspective view of an example of a food processing system.
Figure 2:
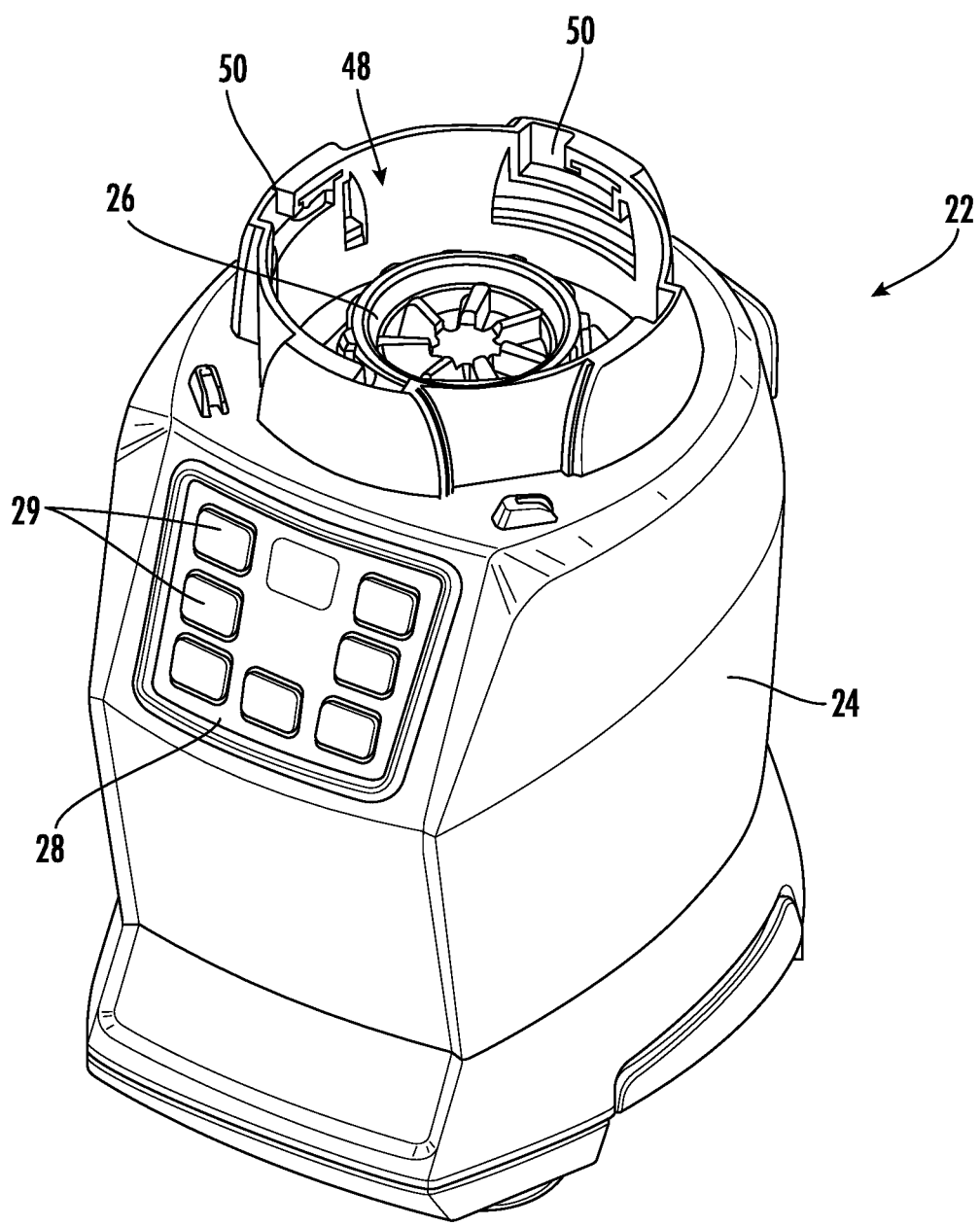
FIG. 2 is a perspective view of a base of a food processing system.

Referring now to FIGS. 1 and 2, an example of a multi-functional food processing system 20 is illustrated. In general, the food processing system 20 can be adapted to perform any food processing or blending operation including as non-limiting examples, dicing, chopping, cutting, slicing, mixing, blending, stirring, crushing, or the like. Although the food processing system illustrated and described herein is a personal blender system, other food processing systems are within the scope of the present disclosure.

The food processing system 20 includes a base 22 having a body or housing 24 within which a motorized unit (not shown) and at least one controller (not shown) are located. The base 22 includes at least one rotary component, such as a drive coupler 26 (see FIG. 2) for example, driven by the motorized unit located within the housing 24. The base 22 additionally includes a control panel or user interface 28 having one or more inputs 29 for turning the motorized unit on and off and for selecting various modes of operation, such as pulsing, blending, or continuous food processing. The at least one drive coupler 26 is configured to engage a portion of an attachment 30 coupled to the base 22 for the processing of food products located within an interior of the attachment 30. This will become more apparent in subsequent FIGS. and discussion.

Figure 3:
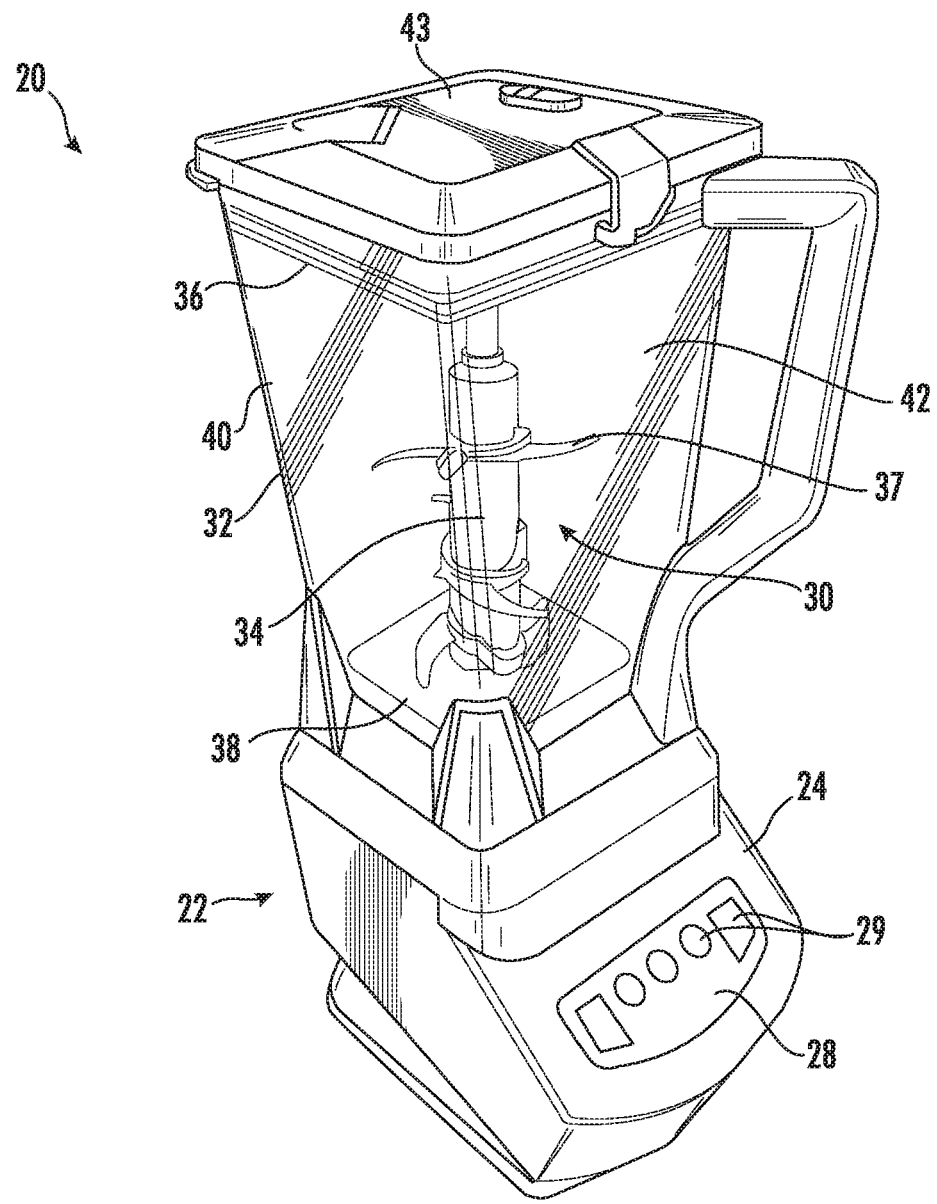
FIG. 3 is a perspective view of a food processing system having a first attachment.

One or more attachments 30 varying in size and/or functionality may be configured for use with the base 22. A first attachment 30 shown in FIG. 3 includes a jar or container 32 having a rotatable blade assembly 34. In some embodiments, the container 32 may be sized to hold approximately 72 fluid ounces. However, embodiments where the container 32 has a larger or smaller capacity are also within the scope of the disclosure. As shown, the container 32 typically includes a first open end 36, a second closed end 38, and one or more sidewalls 40 extending between the first end 36 and the second end 38 to define a hollow processing chamber 42 of the container 32. A rotatable blade assembly 34 may be integrally formed with the second end 38 of the container 32, or alternatively, may be removably coupled thereto. The attachment 30 may additionally include an accessory, such as a lid 43 configured to couple to the first open end 36 of the container 32 to seal the container 32. The second sealed end 38 of the attachment of FIG. 3 is configured to mount to the base 22 to perform a food processing operation. Accordingly, the orientation of the container 32 when the attachment 30 is connected to the base 22 and separated from the base 22 remains generally constant.

Figure 4:
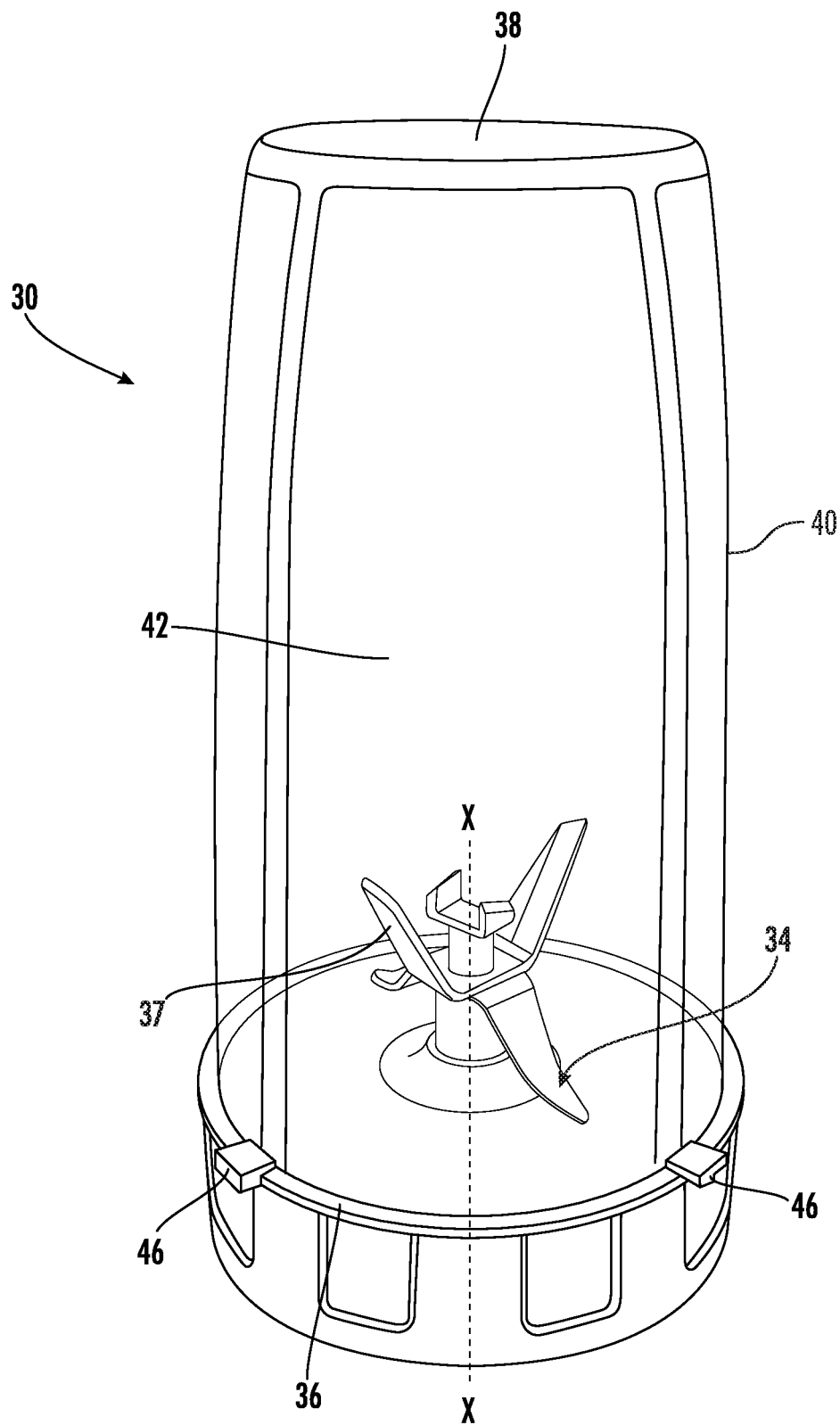
FIG. 4 is a perspective view of an example of an attachment suitable for use with a food processing system.

Another example of an attachment 30 suitable for use with the food processing system is shown in FIG. 4. In the illustrated, non-limiting embodiment, the second attachment 30' is an inverted jar or container 32 having a rotatable blade assembly 34 coupled thereto. Similar to the attachment of FIG. 3, the container 32 typically includes a first open end 36, a second closed end 38, and one or more sidewalls 40 extending between the first end 36 and the second end 40. The sidewalls 40 in combination with one or more of the ends 36, 38 of the container 32 define a hollow interior processing chamber 42 of the container 32. In embodiments where the attachment 30 is a personal blending container that has a first configuration when separated from the base 22 and a second inverted configuration when coupled to the base 22, an accessory, such as a rotatable blade assembly 34 for example, is configured to removably couple to the first open end 36 of the container 32 to seal the processing chamber 42. The container 32 and blade assembly 34 may be threadably coupled together; however, it should be understood that other mechanisms for removably connecting the container 32 and the blade assembly 34 are also contemplated herein.

In each of the various attachment configurations, the rotatable blade assembly 34 is configured to couple to the base 22 of the food processing system 20. A driven coupler (not shown) associated with the at least one blade 37 is positioned a surface of the rotatable blade assembly 34 that is not received within the processing chamber 42. The at least one drive coupler 26 is configured to engage the driven coupler to rotate the at least one blade 37 about an axis X to process the food products located within the processing chamber 42 of the attachment 30. It should be understood that the attachments 30 including a container 32 and a rotatable blade assembly 34 illustrated and described herein are intended as an example only, and that other attachments, are also contemplated herein.

In some embodiments, the attachment 30 may include one or more contact members 46, such as tabs for example, positioned about the periphery of the attachment 30. Although four contact members 46 are generally illustrated in FIG. 4, any number of contact members 46 is within the scope of the disclosure. In embodiments where the attachment 30 includes a container 32 and a blade assembly 34, the contact members 46 may extend outwardly from the container 32, the blade assembly 34, or both.

The contact members 46 of the attachment 30 are configured to cooperate with a mounting area 48 of the base 22 to couple the attachment 30 to the base 22. As shown, the mounting area 48 includes one or more receiving slots 50 within which each of the plurality of contact members 46 of the attachment 30 is receivable. The attachment 30 may be configured to slidably connect to the base 22 of the food processing system 20. Alternatively or in addition, the attachment 30 may be configured to rotatably connect to the base 22 such that the attachment 30 is locked relative to the base 22. However, it should be understood that any suitable mechanism for coupling the attachment to the base 22 is within the scope of the disclosure.

Figure 5:
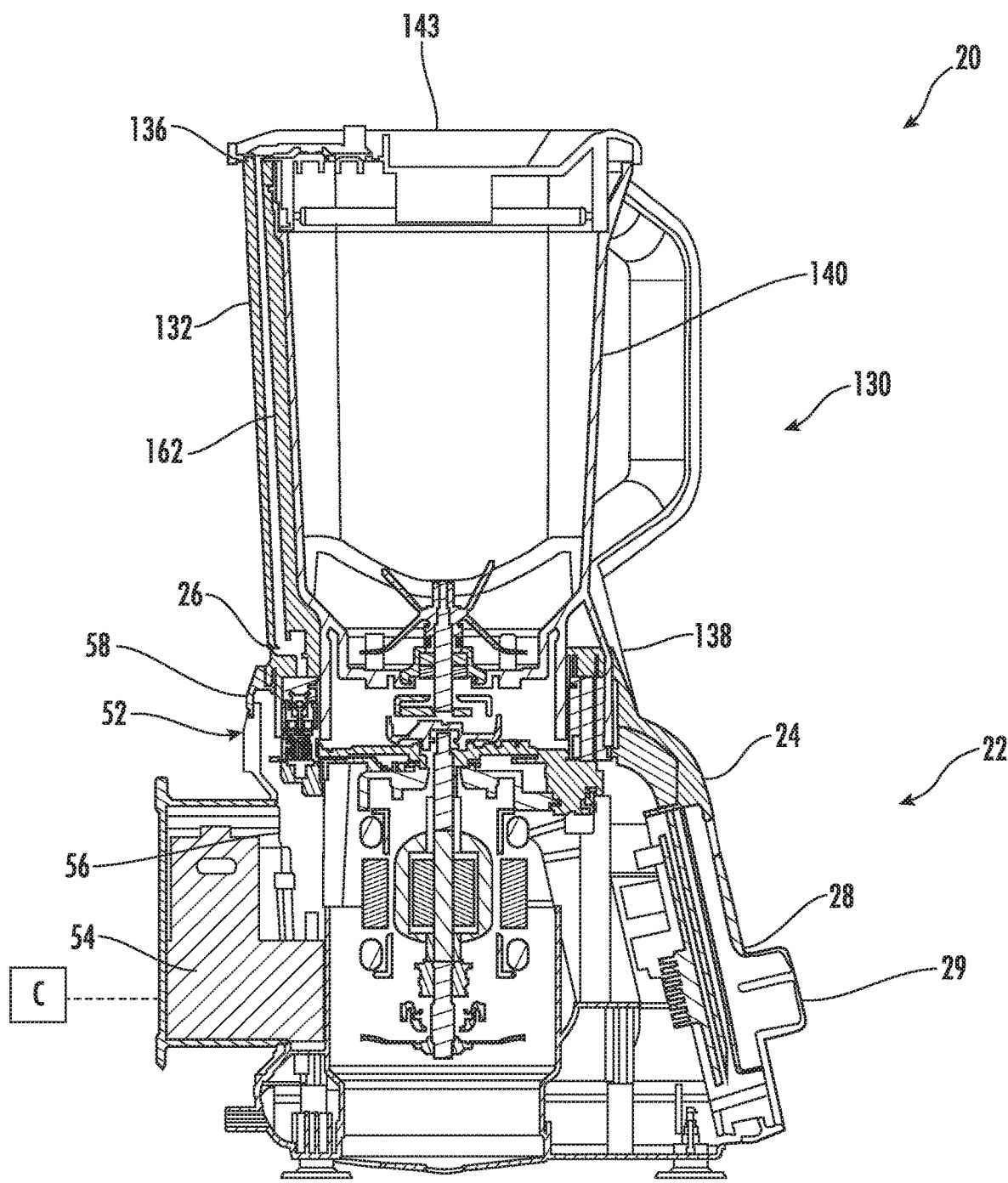
FIG. 5 is a cross-sectional view of a food processing system according to an embodiment.
Figure 6:
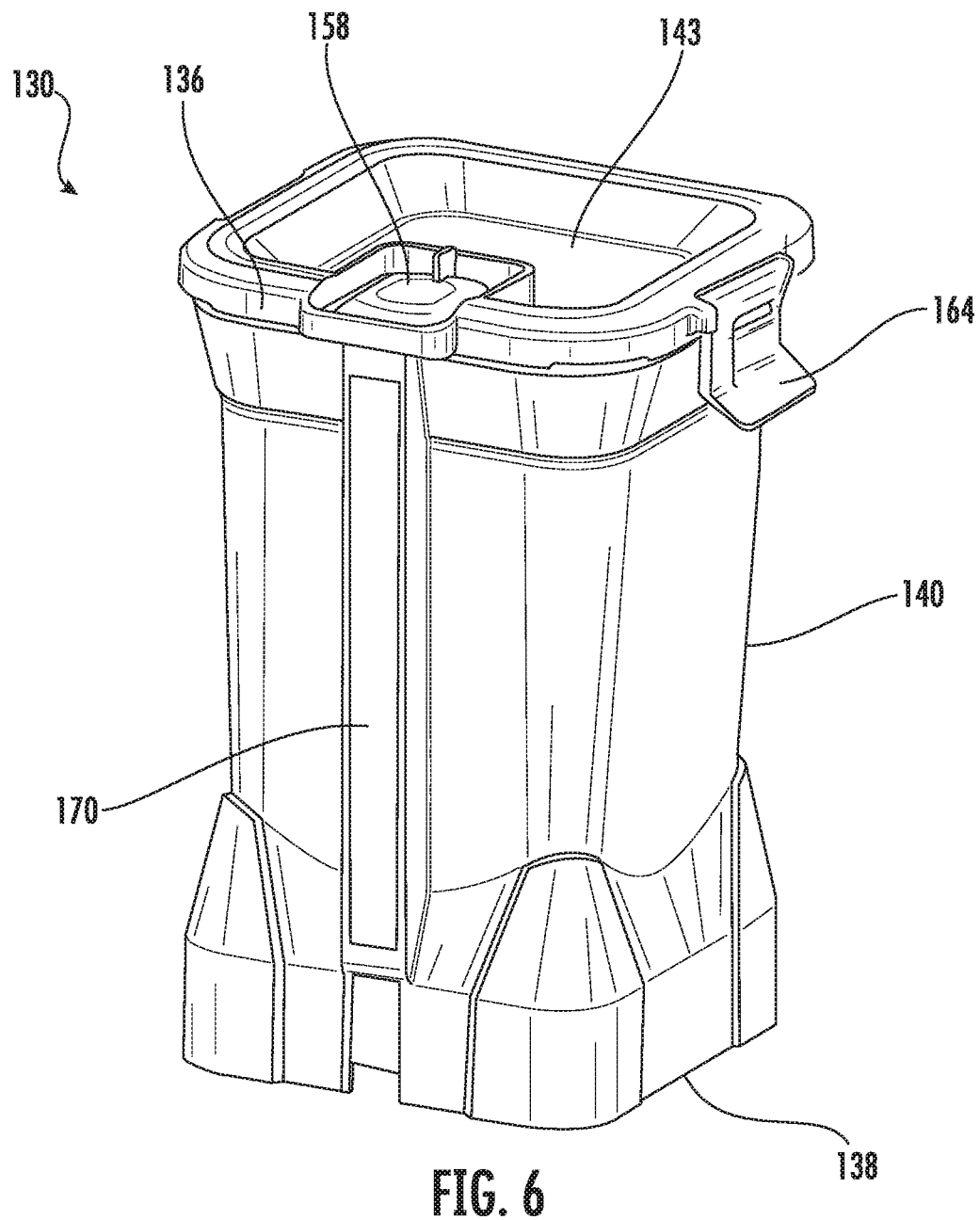
FIG. 6 is a perspective view of a vacuum attachment suitable for use with a food processing system according to an embodiment.
Figure 10:
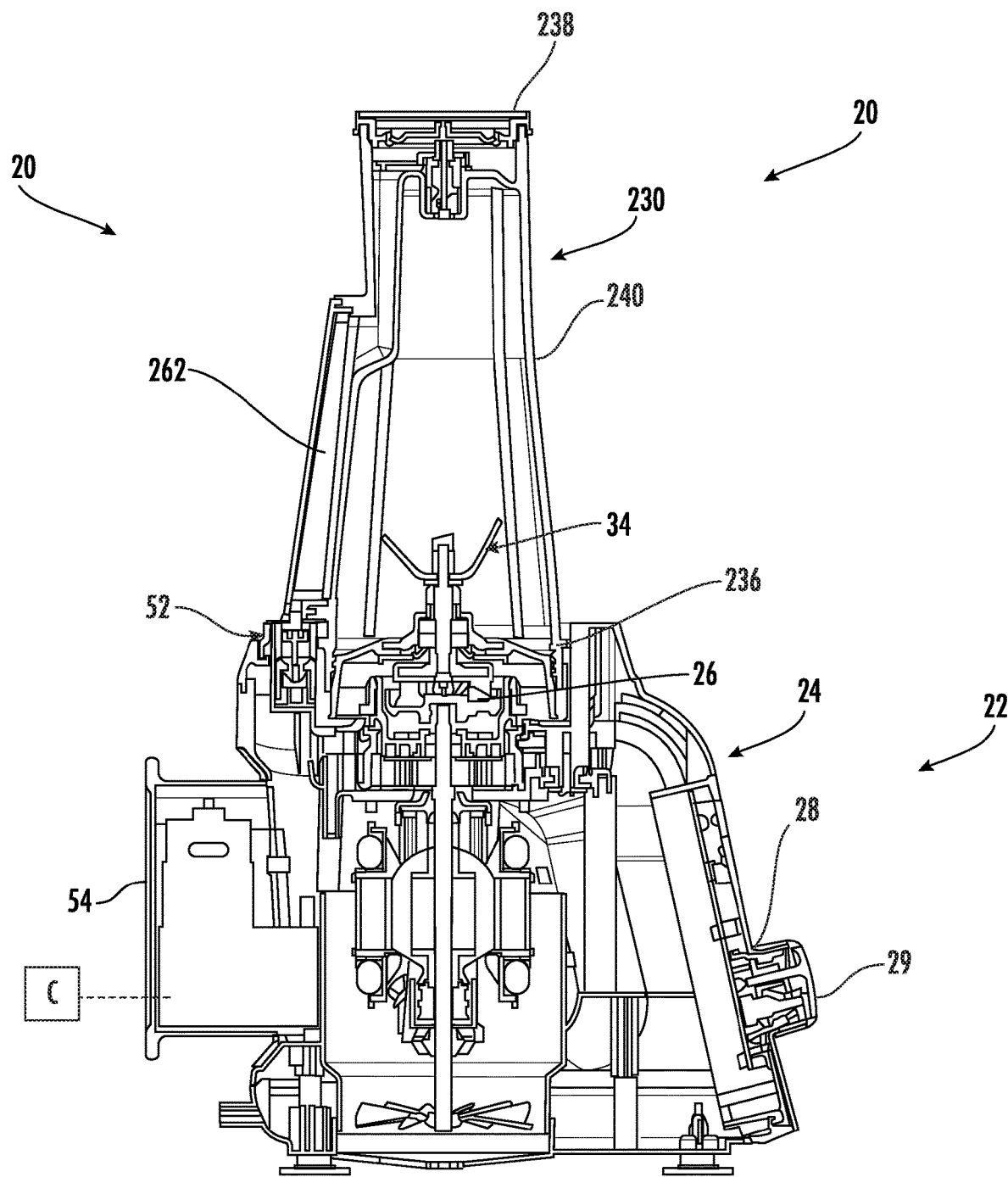
FIG. 10 is a cross-sectional view of a lid of a vacuum attachment according to an embodiment.

With reference now to FIGS. 5 and 10, in an embodiment, the food processing system 20 is operable to perform a vacuum operation. Accordingly, the base 22 of the food processing system 20 may additionally include a vacuum system 52 having a mechanism 54 capable of drawing a vacuum, such as a vacuum pump for example. However, any mechanism capable of drawing a vacuum is contemplated herein. At least one attachment 30 configured for use with the base 22 is operably coupled to the vacuum pump 54 when the attachment 30 is connected with the base 22. In the illustrated, non-limiting embodiment, the vacuum pump 54 is arranged at a side 56 of the base 22, such as at the rear thereof, to allow one or more attachments 30 having varying configurations to easily couple to the vacuum pump 54. The vacuum pump 54 may be operably coupled to a controller, illustrated schematically at C, such that the vacuum pump 54 is operated by the controller C in response to actuation of one or more inputs 29 of the user interface 28.

With continued reference to FIGS. 5 and 10, and further reference now to FIGS. 6-9 and 11-16 various attachments suitable for a vacuum operation are illustrated. In the illustrated, non-limiting embodiment of FIGS. 6-9 an example of a vacuum attachment 130 suitable for use to perform a vacuum operation is shown. In the illustrated, non-limiting embodiment of FIGS., the attachment 130 is similar to the attachment of FIG. 3, and includes a vacuum container 132 sized to hold approximately 72 fluid ounces. As previously described, the container 132 typically includes a first open end 136, a second closed end 138, and one or more sidewalls 140 extending between the first end 136 and the second end 138 to define a hollow interior processing chamber 142 of the container 132.

The vacuum attachment 130 additionally includes a lid 143 configured to selectively couple to the first open end 136 of the container 132 to seal the chamber 142 of the container 132. In an embodiment, the lid 143 has at least one internal chamber formed therein, partially defined by a wall 145. As shown, the lid 143 may include a first chamber 150 located at a first side 152 thereof and a second chamber 154 arranged adjacent a second side 156 thereof. Although the first chamber 150 and the second chamber 154 are shown as being disposed at opposite sides of the lid 143, or adjacent sides of the lid 143, embodiments where the chambers 150, 154 are formed at the same side of the lid 143 are also within the scope of the disclosure.

In an embodiment, the lid 143 includes at least one component, such as a flap 158 for example, movable between a first closed position and a second open position, relative to the lid 143. When the flap 158 is in the first closed position, an interior facing surface 160 of the flap 158 defines an upper extent of first chamber 150. When the lid 143 is affixed to the first open end 136 of the container 132, the first chamber 150 is arranged in fluid communication with a vacuum passage 162, to be described in more detail below. Accordingly, the first chamber 150 may also be considered a vacuum chamber. Alternatively, or in addition, a second flap 164 pivotal between a first closed position and a second open position, may be operable to operate a release mechanism, to be described in more detail later, disposed within the second chamber 154.

The container 132 additionally includes a vacuum passage or conduit 162 configured to fluidly connect the vacuum pump 54 and the vacuum chamber 150 when the attachment 130 is coupled to the base 22. In an embodiment, an end 166 of the vacuum passage 162 may extend into or directly couple with the vacuum chamber 150. However, because the vacuum chamber 150 is disposed in the lid 143, in other embodiments, the vacuum passage 162 does not extend beyond the end 138 of the container 132. As a result, a portion of the vacuum passage 162 may be at least partially defined by the lid 143.

Figure 7:
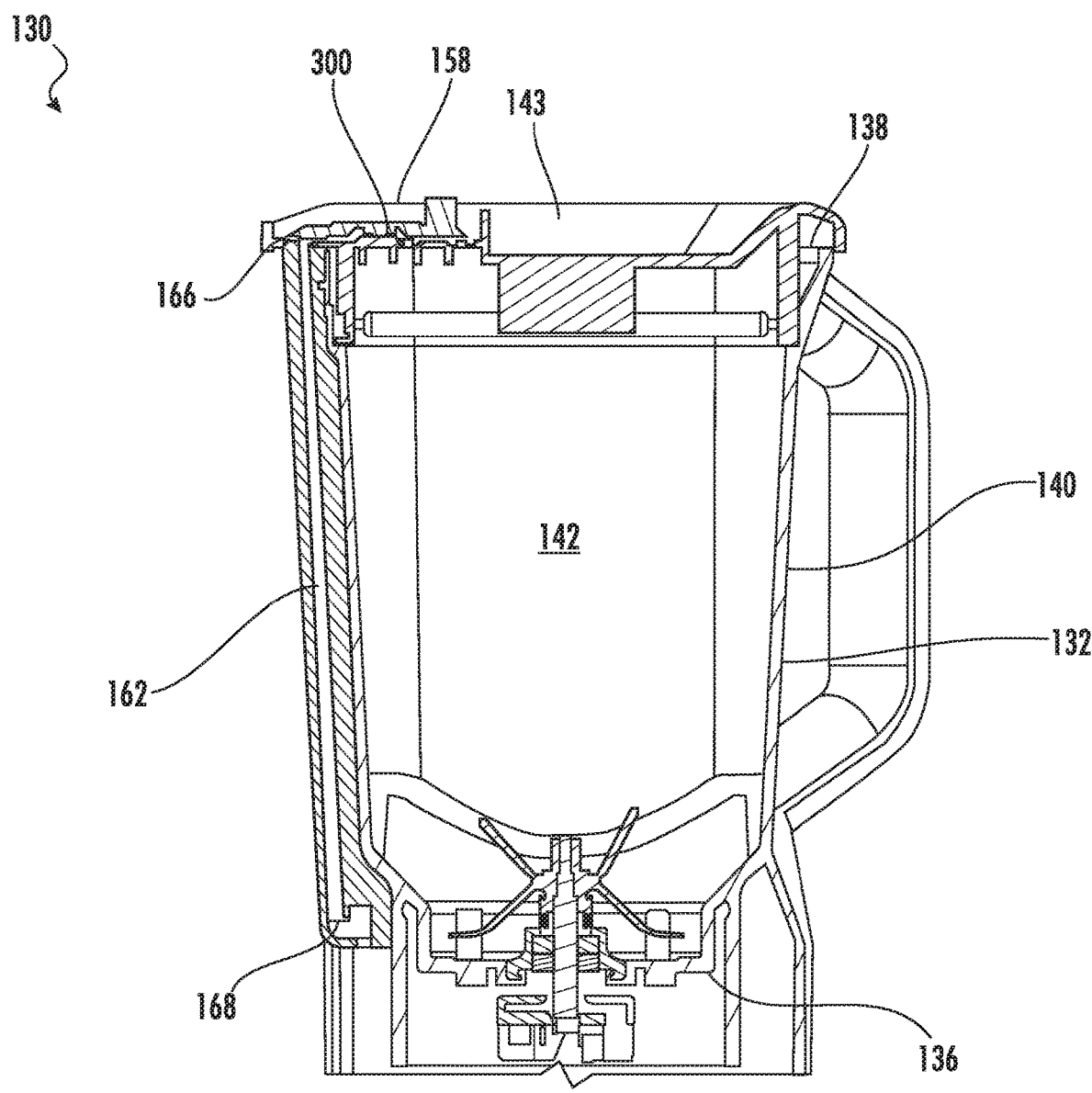
FIG. 7 is a cross-sectional view of a vacuum attachment of FIG. 6 according to an embodiment.
Figure 8:
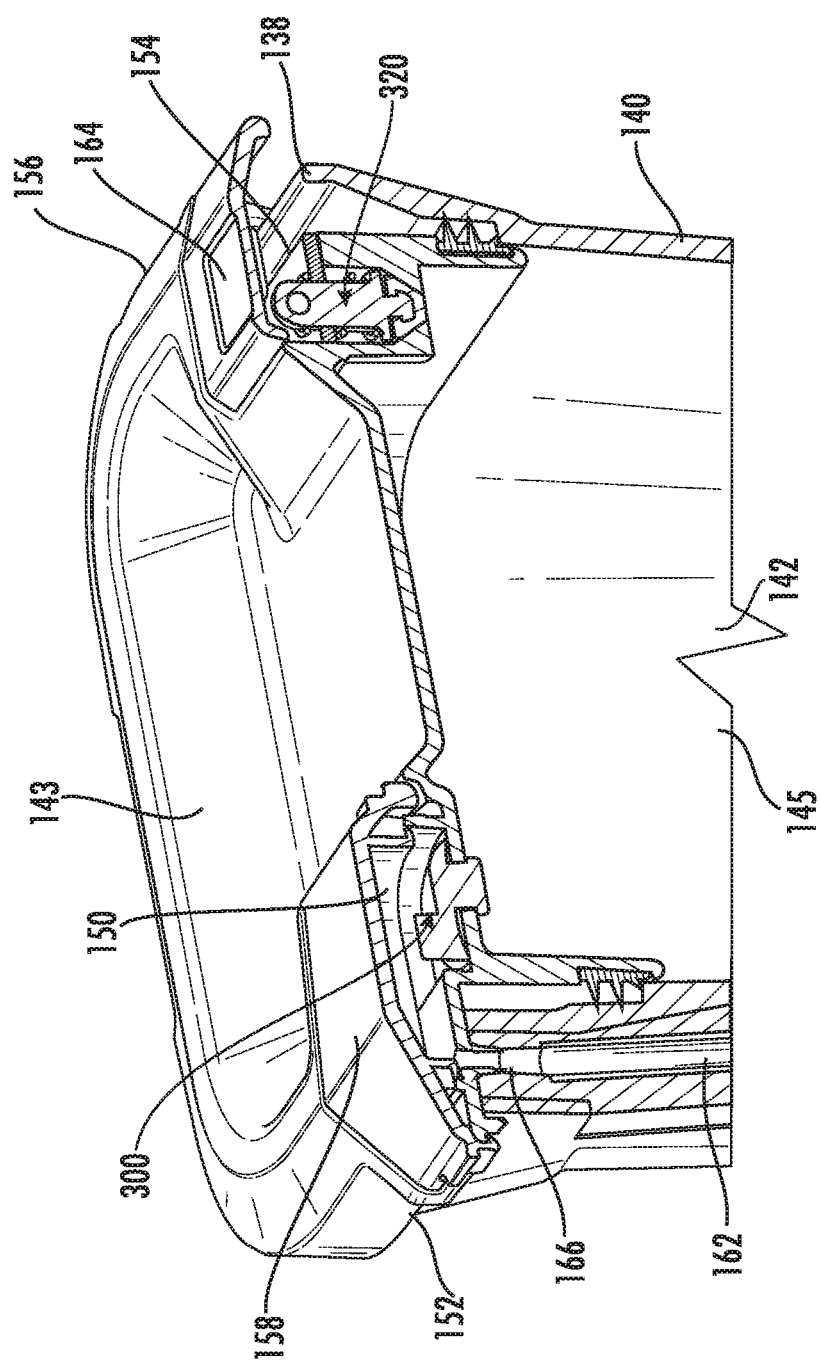
FIG. 8 is a perspective cross-sectional view of a lid of a vacuum attachment according to an embodiment.
Figure 9:
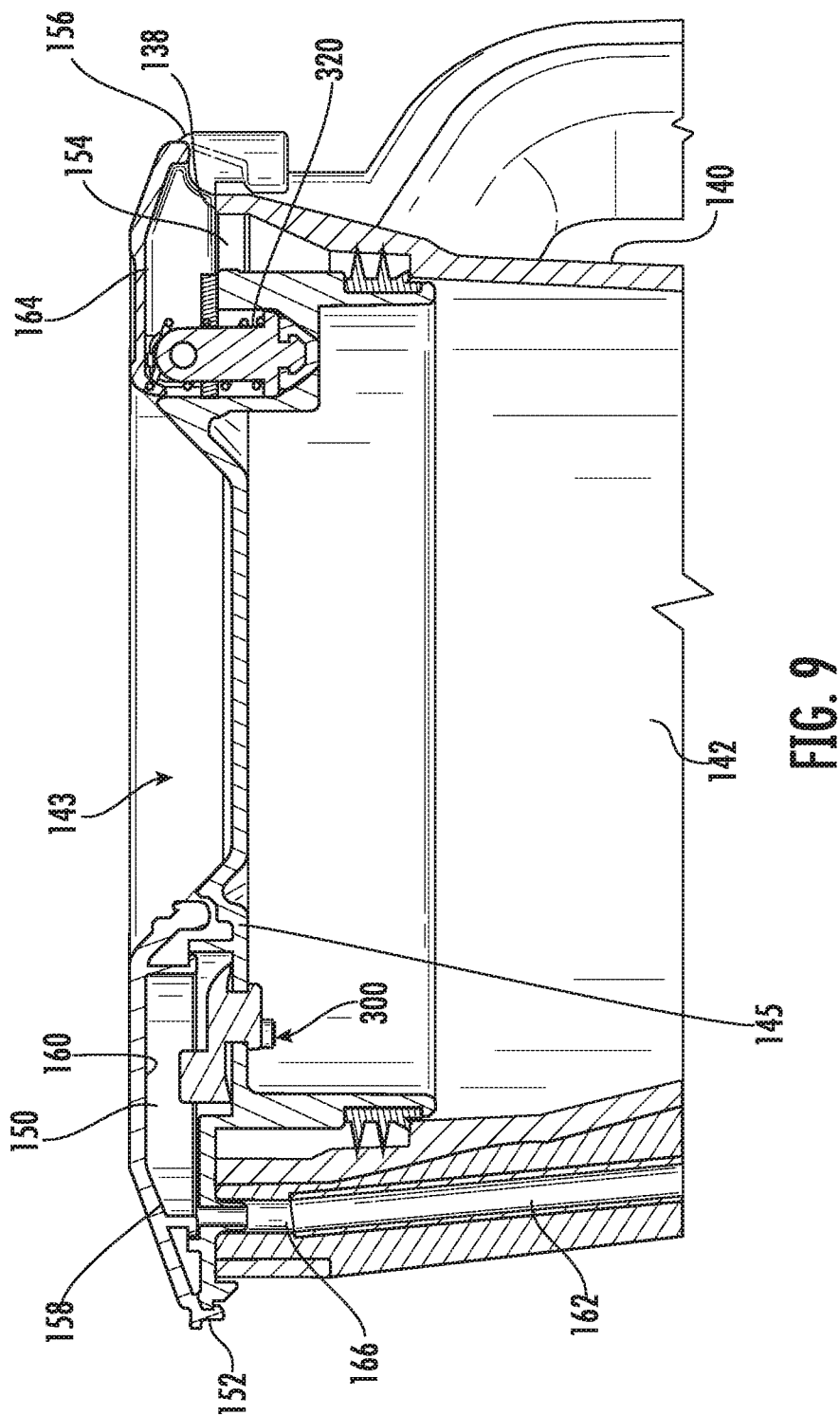
FIG. 9 is a cross-sectional view of a lid of a vacuum attachment according to an embodiment.

The vacuum passage 162 may have a generally linear configuration as shown in FIG. 7, or alternatively, may have one or more bends or angles formed therein. Because the vacuum pump 54 is located at a side 56 of the base 22, a distal end 168 of the vacuum passage 162 configured to abut with a surface of the base 22 to fluidly couple to the vacuum pump 54 is similarly located adjacent a corresponding side of the container 132. In an embodiment, a portion of the vacuum system 52 is arranged adjacent an upper surface 58 of the base 22. As a result, the distal end 168 of the vacuum passage 162 may be vertically offset from the first end 136 of the container 132. However, embodiments where the distal end 168 of the vacuum passage 162 is aligned with the first end 136 of the container 132 are also considered herein.

Another example of a vacuum attachment 230 is shown in FIGS. 10-15. A vacuum attachment 230 having a configuration similar to the inverted jar or container of FIG. 4 is shown. The attachment 230 includes an inverted jar or container 232 including a first open end 236, a second closed end 238, and one or more sidewalls 240 extending between the first end 236 and the second end 238 to define a hollow processing chamber 242 of the container 232. An accessory, such as a rotatable blade assembly as previously described for example, is connectable to the first open end 236 of the container 232 and is configured to couple to a drive unit of the base 22, when the container 232 is installed about the base 22. The attachment 230 generally has a first configuration when separated from the base 22 and a second inverted configuration when coupled to the base 22.

In the illustrated, non-limiting embodiment, the container 232 includes an interior wall 245 disposed at a position between the first end 236 and the second end 238. In the illustrated, non-limiting embodiment, the interior wall 245 seals the processing chamber 242 but is offset from the second end 238 of the container 232. A cover 258 is vertically offset from the interior wall 245, at a position between the interior wall 245 and the second end 238 of the container 232. The cover 258 may be permanently affixed to the container 232, or alternatively, may be able to move, for example pivot, relative to the interior wall 245 between a closed position and an open position. In an embodiment, the cover 258 extends from a protrusion 259 located at a central portion of the interior wall 245 to an interior surface 261 of the sidewall 240. A gasket or seal 263 may be mounted to the cover 258 and configured to contact the interior surface 261 of the sidewall 240 and the interior wall 245 to form an air-tight seal there between. Together the interior wall 245, adjacent sidewall 240, and cover 258 cooperate to define a vacuum chamber 250 sealed from the ambient atmosphere and separate from the processing chamber 242.

Figure 12:
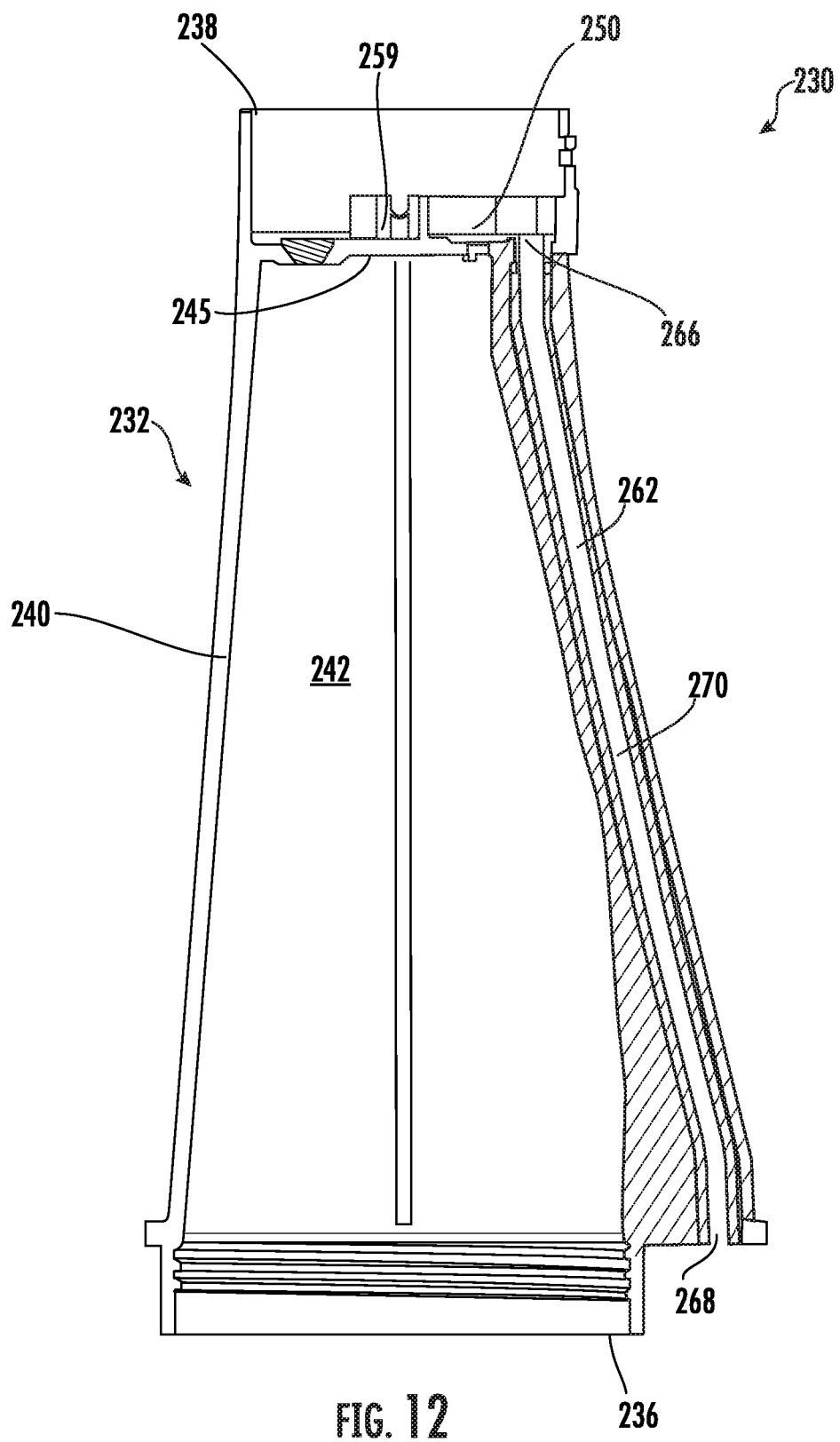
FIG. 12 is a cross-sectional view of the vacuum attachment of FIG. 11 according to an embodiment.
Figure 13:
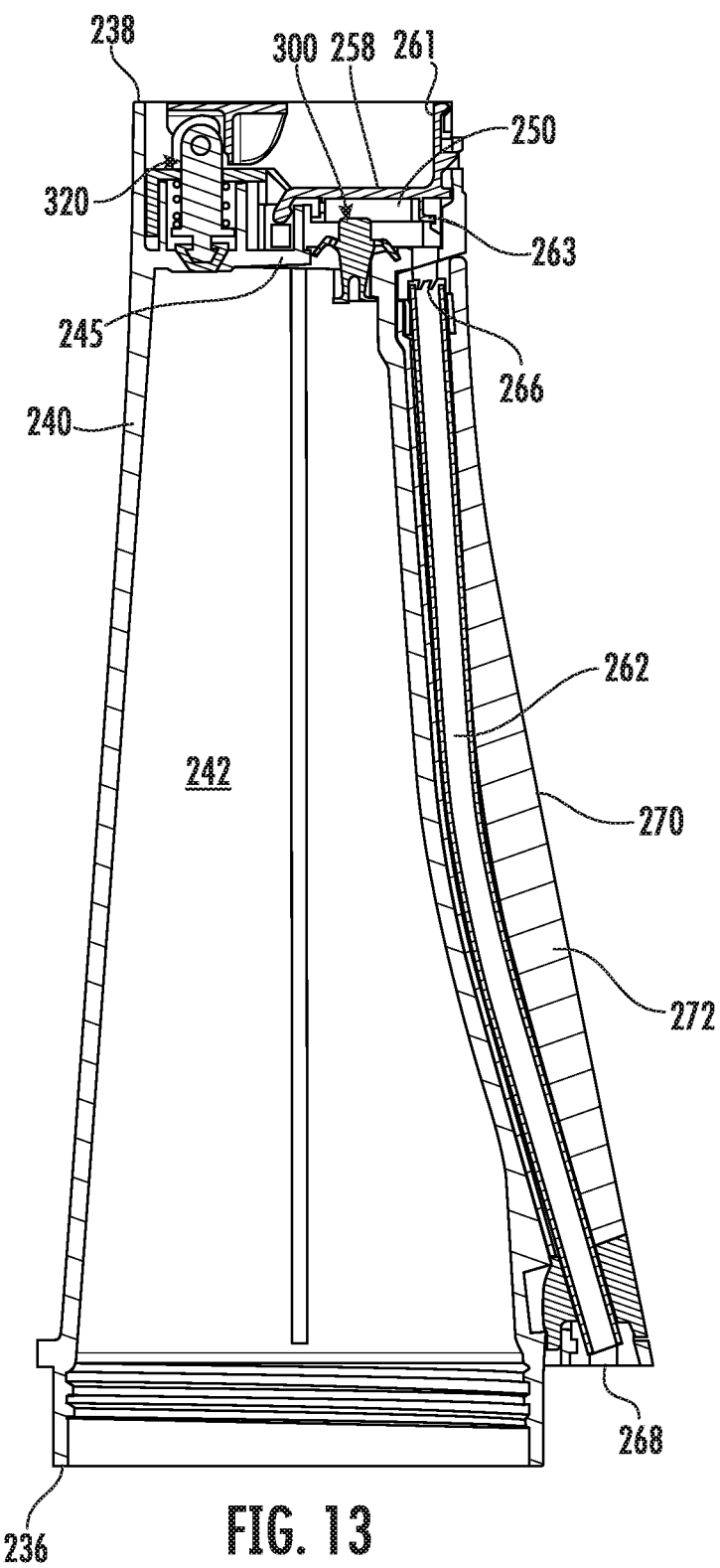
FIG. 13 is a cross-sectional view of another vacuum attachment suitable for use with a food processing system according to an embodiment.
Figure 14B:
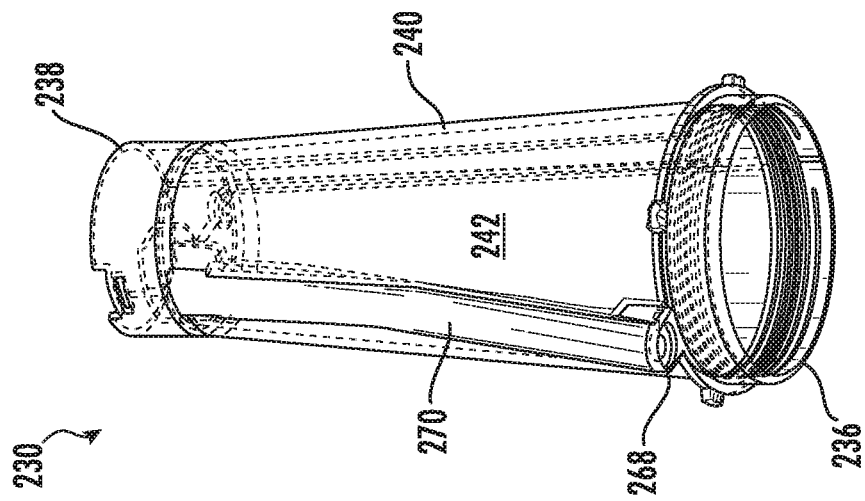
FIG. 14B is a perspective schematic view of the vacuum attachment of FIG. 14A according to an embodiment.
Figure 14A:
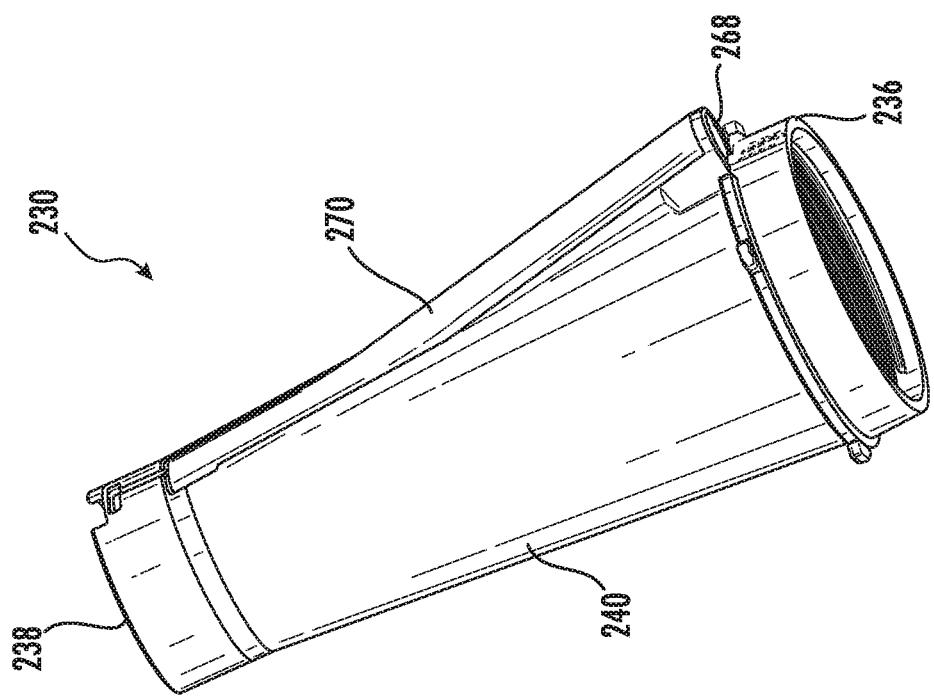
FIG. 14A is a perspective view of another vacuum attachment suitable for use with a food processing system according to an embodiment.
Figure 15:
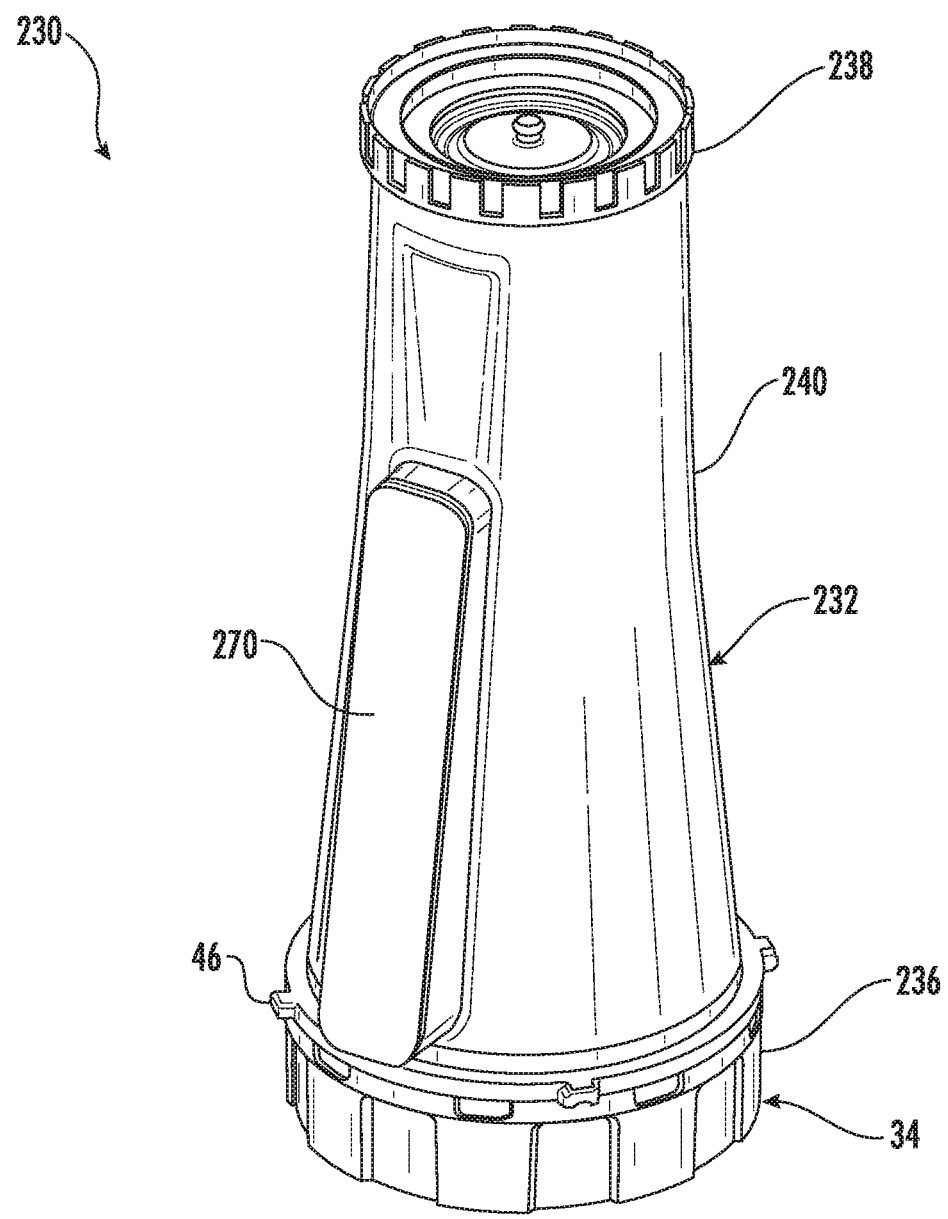
FIG. 15 is a perspective view of another vacuum attachment suitable for use with a food processing system according to an embodiment.

The container 132 additionally includes a vacuum passage or conduit 262 configured to fluidly connect the vacuum pump 54 and the vacuum chamber 250 when the attachment 230 is coupled to the base 22. The vacuum passage 262 may have a generally linear configuration as shown in FIG. 12, or alternatively, may have one or more bends or angles formed therein (see FIG. 15). Because the vacuum pump 54 is located at a side 56 of the base 22, the distal end 168 of the vacuum passage 162 configured to abut with a surface of the base 22 to fluidly couple to the vacuum pump 54 is similarly located adjacent a corresponding side of the container 232. Similar to the attachment 130, as a result of the positioning of the vacuum system 52 relative to the base 22, the distal end 268 of the vacuum passage 262 may be vertically offset from the first end 236 of the container 232. However, embodiments where the first end 164 of the vacuum passage 162 is aligned with the first end 136 of the container 132 are also considered herein.

Figure 11:
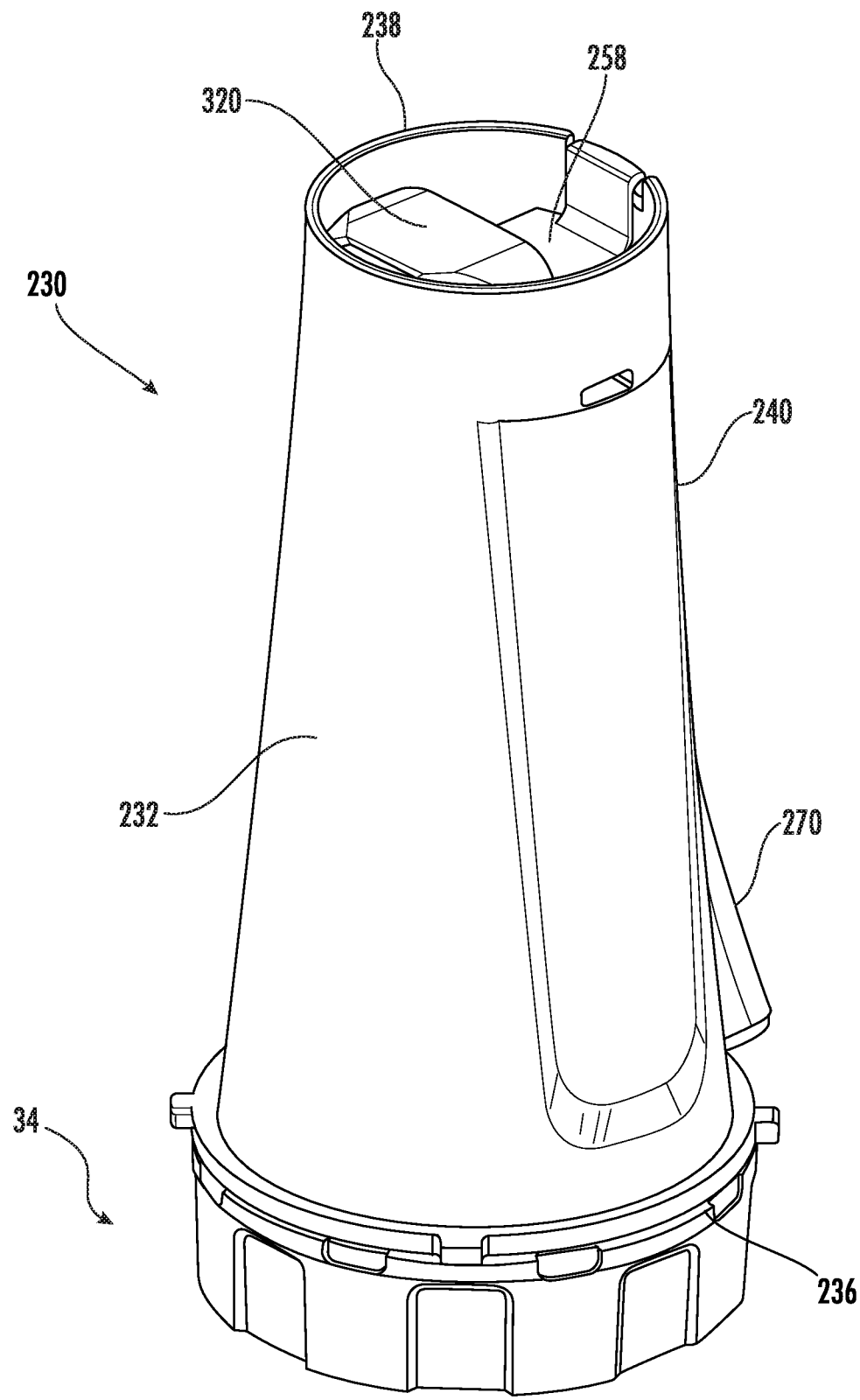
FIG. 11 is a perspective view of a vacuum attachment suitable for use with a food processing system according to an embodiment.

With reference now to both vacuum attachments 130, 230, in an embodiment, the vacuum passage 162, 262 is integrally formed with the body, such as the sidewall 140, 240 for example, of the container 132, 232. As best shown in FIG. 11, the vacuum passage 162, 262 is embedded within a sidewall 140, 240 of the container 132, 232. However, in other embodiments, the vacuum passage 162, 262 may be arranged at an exterior of the container 32. In such embodiments, the vacuum passage 162, 262 may be at least partially defined by the sidewall 140, 240 of the container 132, 232, or alternatively, may be completely separate from the sidewall 140, 240. In such embodiments the vacuum passage 162, 262 may be formed with the container 132, 232 such as via an additive manufacturing, overmoulding, insert molding, or injection molding process for example.

In other embodiments, a secondary structure 170, 270 is affixed to the sidewall 140, 240 of the container 132, 232 to define a portion of the vacuum passage 162. The secondary structure 170, 270 may is formed from the same material, or alternatively, a different material than the material of the container 132, 232. In an embodiment, best shown in FIG. 12, the secondary structure 270 is integrally formed with the container 232 via an over-molding or insert molding process. In another embodiment, shown in FIGS. 13-14, the secondary structure 270 is a molded or extruded silicone channel and the edges of the channel are sealed to the sidewall 240 of the container 232 such that food cannot become lodged or stuck at the interface between the sidewall 240 and the channel 270. The channel 270 may further include a rigid tube 272 (see FIG. 13) that forms at least a portion of the vacuum passage 262. However, embodiments, where the silicone channel 270 is contoured to define a vacuum passage 262 between the channel 270 and the sidewall 240 of the container 232 are also contemplated herein. In addition, although the secondary structure 270 is described as a silicone channel, it should be understood that any suitable material is within the scope of the disclosure. In the non-limiting embodiment of FIG. 15, the secondary structure 270 is affixed to the container 232 via an induction weld.

It should be understood that any secondary structure 170, 270 having any configuration may be affixed to or integrally formed with the container 132, 232 using any of the connection processes described herein, or any other suitable processes. Regardless of the material of the second structure 170, 270 and/or the manufacturing process used to connect the secondary structure 170, 270 with the container 132, 232 at least a portion of the secondary structure 170, 270 encasing a portion of the vacuum passage 162, 262 is flush with and typically forms a smooth transition with the adjacent sidewall 140, 240 of the container 132, 232.

Figure 18:
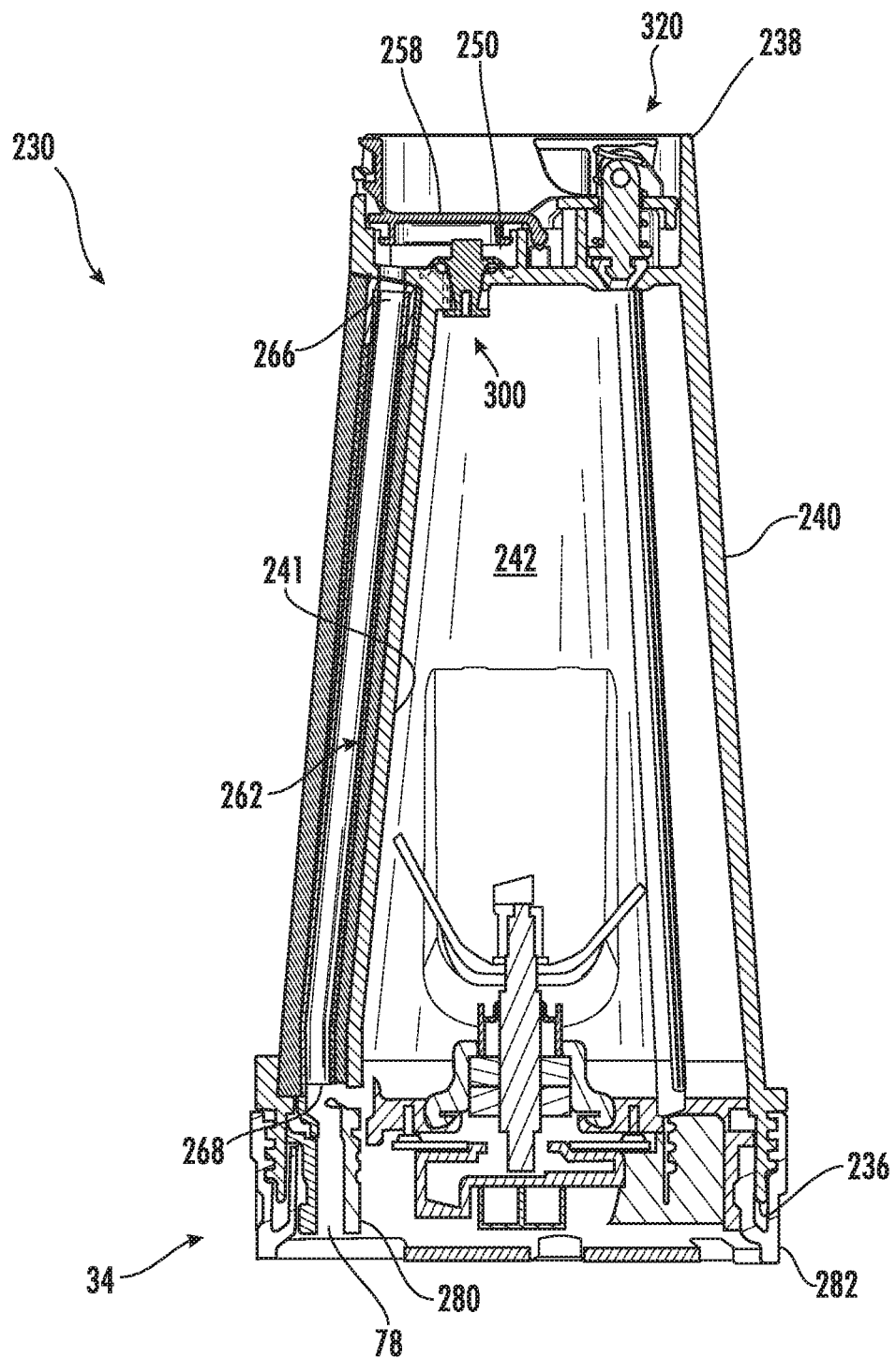
FIG. 18 is a cross-sectional view of another vacuum attachment suitable for use with a food processing system according to an embodiment.

With reference now to FIG. 18, in an embodiment, at least a portion of the vacuum passage 162, 262 is located at an interior of the container 132, 232. As shown, the vacuum passage 162, 262 extends through the processing chamber 142, 242 such that the vacuum passage 162, 262 remains isolated from the processing chamber 142, 242 over the height of the processing chamber 142, 242. As a result, an exterior surface of the container 132, 232 is generally smooth and unaltered by the presence of a vacuum passage 162, 262. In addition, in some embodiments the vacuum passage 162, 262 may extend beyond an end of container 132, 232 configured to connect to the food processing base 22. Although the vacuum passage 162, 262 is shown as arranged at an inner surface 241 of the sidewall 140, 240, it should be understood that the vacuum passage 162, 262 may be arranged at any position within the processing chamber 142, 242. Further, the vacuum passage 162, 262 may be integrally formed with the interior 241 of the sidewall 140, 240 of the container 132, 232, or alternatively, may be encased by a secondary structure (not shown) connected to a surface 241 of the sidewall 140, 240. It should further be understood that embodiments where only a portion of the vacuum passage 162, 262 is arranged within the processing chamber 142, 242, and embodiments where only a portion of the vacuum passage 162, 262 is located external to the processing chamber 142, 242 are also within the scope of the disclosure.

In addition, depending on a position of the end of the vacuum passage 162, 262 relative to adjacent the end of the container 132, 232, connectable to the food processing base 22, in embodiments where the container 232 is a personal blending container, a fluid channel may be formed in one or more accessories configured to couple to the end 236 of the 232. The fluid channel formed in the accessory, such as the rotatable blade assembly 34 for example, will couple the vacuum passage 262 of the container 232 to a vacuum system 52 within the food processing base 22. However, embodiments where the end of the vacuum passage is offset from the open end of the processing chamber 242 are also contemplated herein.

As best shown in FIG. 18, in embodiments where the container 32 is a personal blender container 232, the accessory 34, such as the rotatable blade assembly for example, is configured to couple to the open end 236 of the container 232. The fluid channel 78 within the accessory 34 is configured to form a seal with the vacuum passage 262 in the container 232 every time that the accessory 34 is coupled to the container 232. To ensure this alignment and sealing, the accessory 34 may have a multi-part construction. In the illustrated, non-limiting embodiment, the accessory 34 includes a static inner portion 280 that defines the fluid channel 78 and a rotatable outer portion 282, that is rotatable relative to the inner portion 280 and the container 232 to selectively couple the accessory 34 to the open end 236 of the container 232. Although the outer portion 282 of the accessory 34 is illustrated and described herein as being configured to couple to the container 232 via a threaded engagement, other connection mechanisms are also within the scope of the disclosure.

Figure 16:
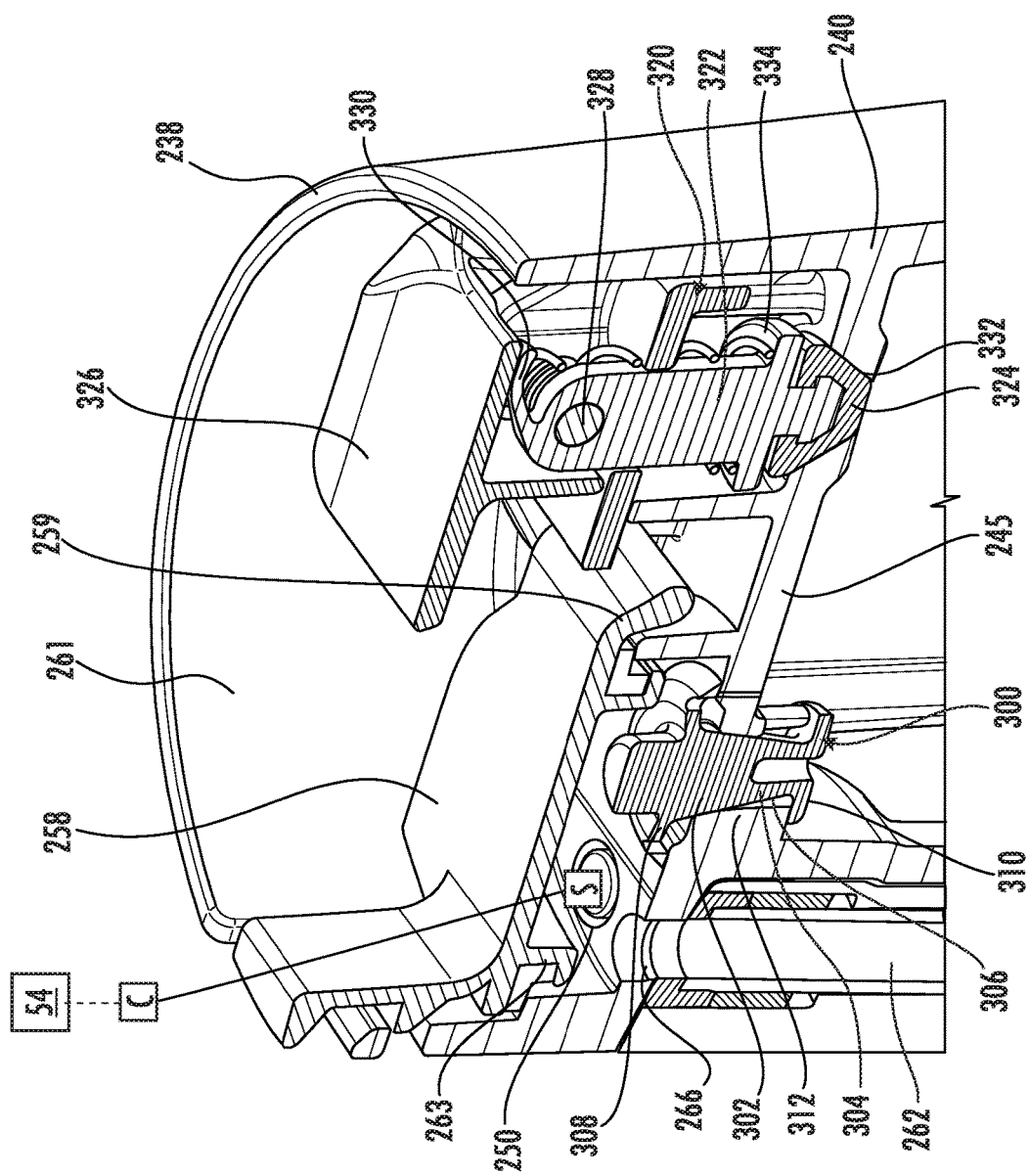
FIG. 16 is a cross-sectional view of an end of a vacuum attachment according to an embodiment.
Figure 17:
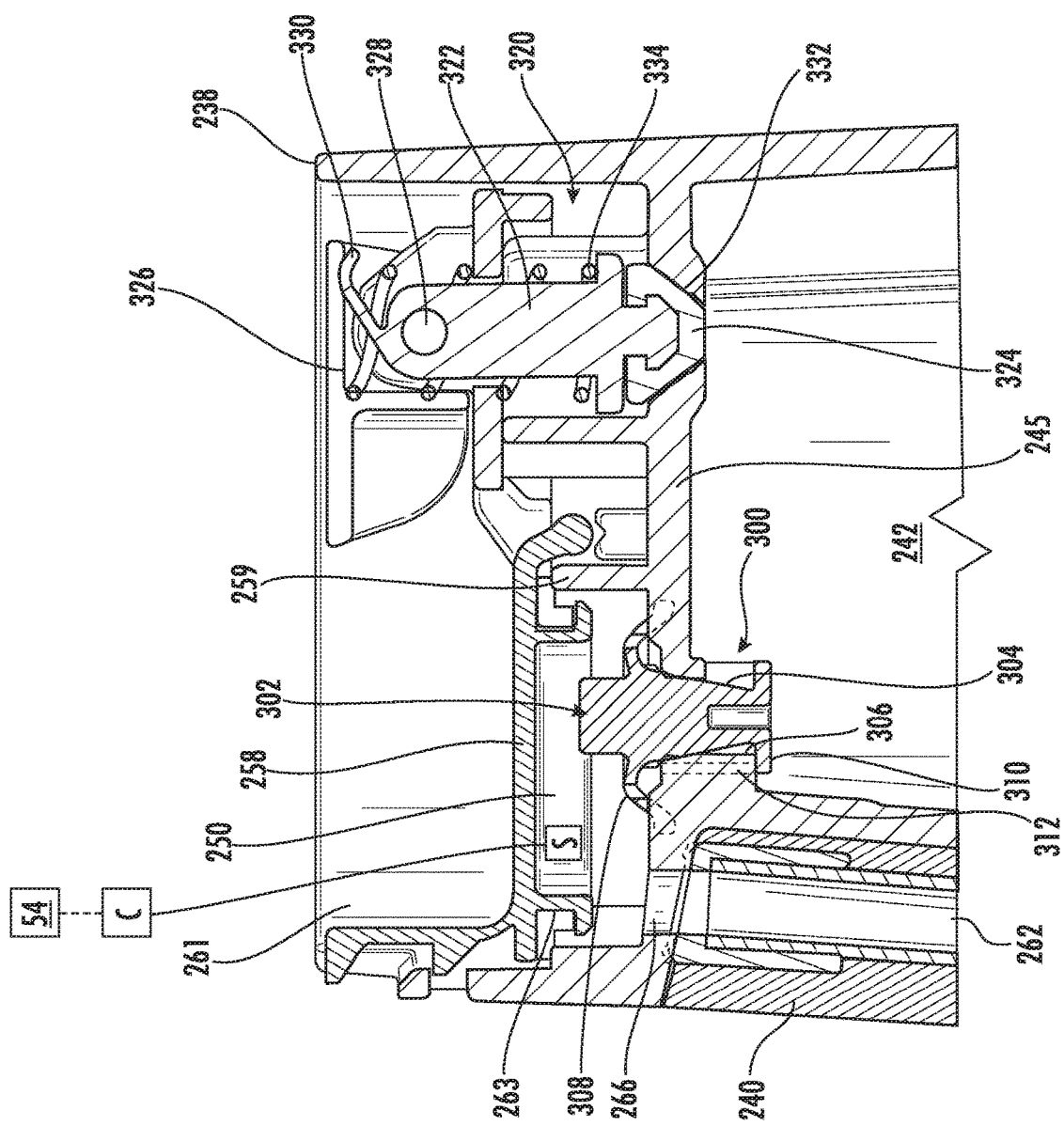
FIG. 17 is a cross-sectional view of an end of a vacuum attachment according to an embodiment.

With reference now to FIGS. 9-10 and 16-17, each vacuum attachments, such as the inverted vacuum jar 230 and the vacuum pitcher 130, includes a vacuum sealing assembly 300 located within the vacuum chamber 150, 250, respectively, at an interface between the processing chamber 142, 242 and the vacuum chamber 150, 250, respectively. With reference now to FIG. 16-17, an example of a vacuum sealing assembly 300 is illustrated in more detail. More specifically, the vacuum sealing assembly 300 may be formed in the wall that separates the processing chamber 142, 242 from the vacuum chamber 150, 250. Accordingly, with respect to the inverted vacuum jar 230, the vacuum sealing assembly 300 may be located at the interior wall 145, and in an embodiment of the vacuum pitcher 130, the vacuum sealing assembly 300 is arranged at a wall 145 of the lid 143. By arranging the vacuum sealing assembly 300 at this position of each attachment, the vacuum sealing assembly 300 is easily accessible by a user when the vacuum attachment 130, 230 is coupled to the base 22 of the food processing system 20. However, in other embodiments, the vacuum sealing assembly 300 may be located at another location about the vacuum attachment 130, 230.

The vacuum sealing assembly 300 includes an umbrella valve 302 having a valve stem 304 extending through a primary chamber opening 306 formed in the wall 145, 245, and a flange 308 extending generally perpendicular to the valve stem 304. As shown, one or more dimensions of the distal end 310 of the valve stem 304 are greater than the primary chamber opening 306 to restrict movement of the umbrella valve 302 relative to the container or lid, respectively. Via the engagement between the valve stem 304 and the primary chamber opening 306, a flow of fluid or food particles from the interior processing chamber 142, 242 of the container 132, 232 through the primary chamber opening 306 is restricted. The flange 308 of the umbrella valve 302 may be sized such that a portion of the flange 308, such as near the periphery of the flange 308 for example, is in overlapping arrangement with the at least one secondary chamber opening 312 formed in the wall 145, 245. Alternatively, or in addition, the sidewalls of the valve stem 304 may be contoured to similarly overlap with at least one secondary opening chamber 312. In an embodiment, under normal conditions, the valve stem 304 seals both the primary chamber opening 306 and the at least one secondary chamber opening 312 to prevent a flow of fluid and/or food particles there through. However, embodiments where the flange 308 is operable to seal the at least one secondary chamber opening 312 are also contemplated herein. The configuration of the umbrella valve 302 used in the inverted vacuum jar 230, may be identical to, or alternatively, different than the configuration of the umbrella valve 302 used in the vacuum pitcher 130.

During a vacuum operation, when either attachment 130, 230 is mounted to the base 22 and the vacuum passage 162, 262 is operably coupled to the vacuum system 52, the vacuum mechanism 54 generates a negative pressure which is applied to the exposed surface of the umbrella valve 302. The negative pressure generated will cause the peripheral portion of the flange 308 to separate from the secondary chamber opening 312 just enough to allow air within the processing chamber 142, 242 to be drawn there through. As soon as operation of the vacuum mechanism 54 ceases and the negative pressure is removed, the peripheral portion of the flange 308 will bias back into its original position to seal the secondary chamber opening 312. This bias may be the result of the resilient material, such as silicone for example, from which the umbrella valve 302 is formed. Alternatively, a biasing mechanism (not shown) may be used to facilitate movement of the flange 308 back into a sealing position. A vacuum operation may be performed after food has been disposed within the chamber 142, 242 but prior to performing a food processing operation. In another embodiment, a vacuum operation is initiated to draw a vacuum within the chamber 142, 242 after performance of a food processing operation has been performed. Forming a vacuum after a blending operation may be used to increase the shelf life or storage of the food products within the attachment 130, 230.

In an embodiment, the food processing system 20 may include a sensor S operable to detect a pressure within the attachment 130, 230. In an embodiment, the sensor S is located within the vacuum passage 162, 262 or the vacuum chamber 150, 250. However, in other embodiments, the sensor S may be located within the processing chamber 142, 242. The controller C is configured to operate the vacuum mechanism 54 in response to the pressure measured by the sensor S. In an embodiment, a target negative pressure is associated with a vacuum operation performed by the food processing system 20. The target pressure may vary based on one or more parameters including, but not limited to, the type of attachment 30 connected to the food processing base 22 and the volume of material within the processing chamber 142, 242. In an embodiment, once the pressure measured by the sensor S and communicated to the controller C is equal to the target pressure, the controller C may stop operation of the vacuum mechanism 54.

Alternatively, the controller C may be configured to operate the vacuum mechanism 54, either continuously or intermittently, after the target pressure is detected. In an embodiment, the controller C may be configured to operate the vacuum mechanism 54 for a fixed amount of time after the pressure within the vacuum chamber 150, 250 and/or vacuum passage 162, 262 is equal to the target pressure. For example, the controller C may operate the vacuum mechanism 54 for an additional ten seconds after the target pressure has been detected within the attachment 130, 230. In other embodiments, the controller C may operate the vacuum mechanism 54 until a second target negative pressure, greater than the first target pressure is achieved. Because a given amount of pressure is required to move the vacuum sealing assembly 300 to fluidly couple the vacuum chamber 150, 250 and the processing chamber 142, 242, the pressure within the vacuum chamber 150, 250 may be different, for example a greater negative pressure, than the pressure within the processing chamber 142, 242. When the sensor S detects that the pressure has reached the first target pressure, such as −80 kPa for example, the pressure within the processing chamber 142, 242 may in fact be less, such as −60 kPa for example, than the first target pressure. Accordingly, operation of the vacuum mechanism 54 for an additional period of time or until a second target pressure has been reached may compensate for the pressure required to operate the vacuum sealing assembly 300, to achieve the first target pressure within the processing chamber 142/242. Although continued operation of the vacuum mechanism 54 is described herein as being determined based on time or a second threshold, any suitable control of the vacuum mechanism to achieve the desired pressure within the processing chamber 142, 242 is within the scope of the disclosure.

The vacuum attachment 130, 230 additionally includes a release mechanism 320 operable to vent the processing chamber 142, 242 of the container 132, 232 to ambient via a release path, thereby breaking the vacuum formed therein. The release mechanism 320 is similarly mounted at a location of the attachment 130, 230 that is easily accessible by a user. As shown, the release mechanism 320 is located remotely from and is not connected to the vacuum sealing assembly 300. However, it should be understood that embodiments where the release mechanism 320 is directly or indirectly coupled to the vacuum sealing assembly 300 are also within the scope of the disclosure. With respect to the inverted vacuum jar 230, the release mechanism 320 is mounted at the exposed second end 238 of the container 232. With respect to the vacuum pitcher 130, the release mechanism 320 may be mounted within the second chamber 154 formed in the lid 143.

An example of a release mechanism 320 is shown in more detail in FIGS. 16-17. In the illustrated, non-limiting embodiment, the release mechanism 320 includes a connector 322 having a sealing member 324 mounted to an end thereof. The release mechanism 320 additionally includes an actuator 326 pivotally coupled to the connector 322 via a pin 328 defining a pivot axis of the actuator 326. In an embodiment, a camming lever 330 extends from the connector 322 toward the actuator 326. When the release mechanism 320 is in an unactuated state, the sealing member 324 is engaged with an adjacent opening 332 fluidly connected to the processing chamber 142, 242. A biasing member 334, such as a coil spring for example, may be coupled to the connector 322 to bias the sealing member 324 into engagement with the opening 332 to form an air tight and liquid tight seal.

To actuate the release mechanism 320, the actuator 326 is pivoted about the axis of pin 328. This movement overcomes the bias of the biasing member 334 and also applies a force to the camming lever 330 of the connector 322, and the cammed movement about the pin 328 causes the connector 322 and sealing member 324 to move vertically, and out of engagement with the opening 332. This movement out the connector 322 out of engagement with the opening 332, allows ambient air to flow through the release path, i.e. between an exterior of the container 132, 232 through the exposed opening 332 and into the processing chamber 142, 242. With respect to the vacuum pitcher 130, in an embodiment, the flap 158 formed in the lid 143 functions as the actuator 326 to selectively operate the release mechanism 320 and break the vacuum within the processing chamber 142 of the container 132. Upon removal of the force from the actuator 326, the biasing member 334 will bias the mechanism 320 back into its original position, thereby sealing the opening 332. Although a pivotally operated release mechanism 320 is illustrated and described herein, it should be understood that a release mechanism operable via a pull motion, twisting motion or other suitable motion to separate the sealing member 324 from the opening 332 are also within the scope of the disclosure. Further, it should be understood that other mechanisms, such as an umbrella valve or a duckbill valve, or any suitable movement may also be used to selectively break the vacuum in the chamber 142, 242.

After a vacuum has been generated within the processing chamber 142, 242 of the container 132, 232 it is difficult, if not impossible to remove an accessory, such as the blade assembly or the lid 143 for example, and access the food product within the processing chamber 142, 242 as a result of the forces acting thereon. Accordingly, a user should first break the vacuum within the container 132, 232 by operating the release mechanism 320 prior to accessing the contents within the interior processing chamber 142, 242 of the container 132, 232.

A vacuum container 132, 232 as illustrated and described herein when used in conjunction with a vacuum mechanism 54 prior to a food processing operation may provide a food product having increased vitamin retention, specifically vitamin C. Exposure to oxygen during the blending process may cause the ingredients within the container 132, 232 to degrade. By removing the oxygen from the container 132, 232, the overall degradation of the nutritional properties of the ingredients being processes is reduced.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments of this invention are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An attachment for use with a food processing system comprising:
   a sealable body including a first open end, a sidewall, and a processing chamber; a chamber opening formed in said sealable body;
   a vacuum passage arranged in fluid communication with said chamber opening, at least a portion of said vacuum passage being associated with at least one of said sidewall and said processing chamber, said vacuum passage further being arranged at a side of said sealable body external to said sidewall and said processing chamber;

a secondary structure connected to said sidewall, said secondary structure and said sidewall cooperating to define at least a portion of said vacuum passage, said secondary structure forming a seamless interface with said sidewall, at least a portion of said secondary structure being flush with an adjacent surface of said sidewall;

a vacuum sealing assembly arranged within said chamber opening; and a release mechanism associated with said processing chamber, the release mechanism being located remotely from the vacuum sealing assembly;

wherein, in a first configuration, said attachment first open end is configured to couple to a lid; and wherein, in a second, inverted configuration, said first open end is configured to removably install about a food processor base for use as a personal blending container.

2. The attachment of claim 1, wherein said vacuum passage is at least partially defined by a rigid tube.

3. The attachment of claim 1, further comprising a vacuum chamber connected to said vacuum passage and said chamber opening.

4. The attachment of claim 1, wherein said release mechanism is movable to fluidly couple said processing chamber to an ambient atmosphere external to said sealable body.

5. The attachment of claim 1, wherein said sealable body has a first orientation when separated from said food processing base and a second orientation when connected to said food processing base.

6. A food processing system comprising:
a food processor base including a vacuum system defining an external surface of a side of the base; and
an attachment configured for removable association with said food processor base, said attachment including:
a sealable body including a first open end, a second closed end, a sidewall, and a processing chamber;
a chamber opening formed in said sealable body;
a vacuum passage arranged in fluid communication with said chamber opening, at least a portion of said vacuum passage being associated with at least one of said sidewall and said processing chamber of said sealable body, said vacuum passage further being arranged at a side of said sealable body external to said sidewall and said processing chamber;
a secondary structure connected to said sidewall, said secondary structure and said sidewall cooperating to define at least a portion of said vacuum passage, said secondary structure forming a seamless interface with said sidewall, at least a portion of said secondary structure being flush with an adjacent surface of said sidewall;

a vacuum sealing assembly arranged within said chamber opening; and a cover configured with said vacuum passage to selectively couple to the second closed end of said sealable body to seal said chamber of the attachment wherein, in a first configuration, when said attachment is installed about said food processor base, said vacuum passage is fluidly connected to said vacuum system.

7. The food processing system of claim 6, wherein said vacuum system is arranged adjacent a first side of said food processing base, and said vacuum passage is aligned with said first side of said food processing base when installed to said food processing base.

8. The food processing system of claim 6, wherein said vacuum passage is at least partially defined by a rigid tube.

9. The food processing system of claim 6, further comprising a vacuum chamber connected to said vacuum passage and said chamber opening.

10. The food processing system of claim 6, further comprising a release mechanism associated with said processing chamber, wherein said release mechanism is movable to fluidly couple said processing chamber to an ambient atmosphere external to said sealable body.

11. The food processing system of claim 6, wherein said sealable body has a first orientation when separated from said food processing base and a second orientation when connected to said food processing base.

12. The attachment of claim 1, wherein the lid is configured to selectively couple to said first open end of said sealable body to seal said chamber of the attachment.

13. The attachment of claim 12, wherein said lid has at least one vacuum chamber formed therein.

14. The attachment of claim 3, wherein said vacuum passage extends into or directly couples to said at least one vacuum chamber.

15. The food processing system of claim 10, wherein the release mechanism is located remotely from the vacuum sealing assembly.

16. The food processing system of claim 1, wherein said vacuum sealing assembly remains coupled to said sealable body when said attachment is removed from said food processing base.

17. The food processing system of claim 11, wherein said vacuum sealing assembly remains coupled to said sealable body when said attachment is removed from said food processing base.

* * * * *